US011035610B2

(12) United States Patent
Nikiforuk

(10) Patent No.: US 11,035,610 B2
(45) Date of Patent: *Jun. 15, 2021

(54) INDUSTRIAL AND HYDROCARBON GAS LIQUEFACTION

(71) Applicant: PTX TECHNOLOGIES INC., Calgary (CA)

(72) Inventor: Colin Nikiforuk, Calgary (CA)

(73) Assignee: COOL SCIENCE INC.

( * ) Notice: Subject to any disclaimer, the term of this patent is extended or adjusted under 35 U.S.C. 154(b) by 148 days.

This patent is subject to a terminal disclaimer.

(21) Appl. No.: 16/380,387

(22) Filed: Apr. 10, 2019

(65) Prior Publication Data

US 2019/0360747 A1    Nov. 28, 2019

Related U.S. Application Data

(62) Division of application No. 15/078,585, filed on Mar. 23, 2016, now Pat. No. 10,415,878.

(Continued)

(51) Int. Cl.
*F25J 1/02* (2006.01)
*F25J 1/00* (2006.01)
(Continued)

(52) U.S. Cl.
CPC ............. *F25J 1/0022* (2013.01); *F25B 15/04* (2013.01); *F25B 25/02* (2013.01); *F25J 1/001* (2013.01);
(Continued)

(58) Field of Classification Search
CPC ........ F25B 15/04; F25B 1/0022; F25B 1/004; F25B 1/0242; F25B 2230/30; F25B 2245/02; F25B 2270/906; C01L 3/106
See application file for complete search history.

(56) References Cited

U.S. PATENT DOCUMENTS 3,817,046 A    6/1974  Aoki
4,139,019 A    2/1979  Bresie et al.
(Continued)

FOREIGN PATENT DOCUMENTS

CA    2512921    8/2004
CA    2679108    9/2008
(Continued)

*Primary Examiner* — Brian M King
(74) *Attorney, Agent, or Firm* — Bennett Jones LLP

(57) ABSTRACT

Liquefaction of industrial gases or gas mixtures (hydrocarbon and/or non-hydrocarbon) uses a modified aqua-ammonia absorption refrigeration system (ARP) to chill the gas or gas mixture during the liquefaction process. The gas is compressed to above its critical point, and the heat of compression energy may be recovered to provide some or all of the thermal energy required to drive the ARP. A Joule Thomson (JT) adiabatic expansion process results in no requirement for specialty cryogenic rotating equipment. The aqua-ammonia absorption refrigeration system includes a vapour absorber tower (VAT) that permits the recovery of some or all of the heat of solution and heat of condensation energy in the system when anhydrous ammonia vapour is absorbed into a subcooled lean aqua-ammonia solution. The modified ARP with VAT may operate at pressures as low as 10 kPa, and the ammonia gas chiller may operate at temperatures as low as −71° C.

25 Claims, 18 Drawing Sheets

Heat and Energy Block Flow

Related U.S. Application Data

(60) Provisional application No. 62/136,839, filed on Mar. 23, 2015.

(51) Int. Cl.
  *F25B 15/04* (2006.01)
  *F25B 25/02* (2006.01)
  *F25B 9/02* (2006.01)

(52) U.S. Cl.
  CPC ............... *F25J 1/002* (2013.01); *F25J 1/004* (2013.01); *F25J 1/0007* (2013.01); *F25J 1/0012* (2013.01); *F25J 1/0015* (2013.01); *F25J 1/0017* (2013.01); *F25J 1/0027* (2013.01); *F25J 1/0221* (2013.01); *F25J 1/0225* (2013.01); *F25J 1/0227* (2013.01); *F25J 1/0236* (2013.01); *F25J 1/0242* (2013.01); *F25B 9/02* (2013.01); *F25J 2205/84* (2013.01); *F25J 2210/62* (2013.01); *F25J 2220/68* (2013.01); *F25J 2230/04* (2013.01); *F25J 2230/30* (2013.01); *F25J 2270/906* (2013.01); *Y02A 30/27* (2018.01); *Y02B 30/62* (2013.01)

(56) References Cited

U.S. PATENT DOCUMENTS

| | | |
|---|---|---|
| 4,446,804 A | 5/1984 | Kristiansen |
| 4,563,202 A | 1/1986 | Yao |
| 5,351,756 A | 10/1994 | Minkkinen et al. |
| 6,023,942 A | 2/2000 | Thomas |
| 6,101,832 A | 8/2000 | Franz et al. |
| 6,516,631 B1 | 2/2003 | Trebble |
| 8,720,216 B1 | 5/2014 | Said |
| 2003/0177785 A1* | 9/2003 | Kimble ............... F25J 1/0202 62/613 |
| 2003/0192329 A1 | 10/2003 | Sarkisian et al. |
| 2009/0113928 A1 | 5/2009 | Vandor et al. |
| 2010/0212329 A1 | 8/2010 | Bridgwood |
| 2013/0306520 A1 | 11/2013 | Nikiforuk |
| 2015/0157963 A1 | 6/2015 | Lissianski et al. |

FOREIGN PATENT DOCUMENTS

| | | |
|---|---|---|
| CN | 102269509 | 12/2011 |
| EP | 1636531 | 3/2006 |
| GB | 2335406 | 9/1999 |
| WO | 2004065869 | 8/2004 |
| WO | 2009057179 | 5/2009 |

* cited by examiner

Heat and Energy Block Flow

INDUSTRIAL AND HYDROCARBON GAS LIQUEFACTION

CROSS REFERENCE TO RELATED APPLICATIONS

This application is a divisional of pending U.S. application Ser. No. 15/078,585, filed on Mar. 23, 2016, the entire contents of which are herein incorporated by reference. U.S. application Ser. No. 15/078,585 claims priority to U.S. provisional patent application No. 62/136,839, filed on Mar. 23, 2015.

FIELD OF THE INVENTION

The present invention relates to systems and methods for the liquefaction of industrial or hydrocarbon gases or gas mixtures.

BACKGROUND OF THE INVENTION

Industrial gases such as $CO_2$, $H_2S$, $N_2$, $O_2$, $H_2$, He, Ar, air and other gases, and hydrocarbon gases such as methane, ethane, propane, ethylene and other hydrocarbon gases, or mixtures of gases, are traditionally liquefied utilizing refrigeration cycles based on well-known Carnot refrigeration or Turbo-Expander cycles. The cryogenic temperatures achieved during these industrial processes which enable liquefaction can require complex cascaded refrigeration cycles that are capital, energy, and operating cost intensive.

Accordingly, there is a need in the art for alternative methods of liquefying industrial and hydrocarbon gases or gas mixtures that may be relatively energy efficient, economical and practical to implement.

SUMMARY OF THE INVENTION

In one aspect, the invention comprises a method for liquefying a gas, comprising the following non-sequential steps:
  a. receiving a gas having an inlet pressure and compressing or decompressing the gas to a desired pressure;
  b. chilling the gas through at least one absorption chiller;
  c. adiabatically reducing the pressure of the gas to liquefy at least a portion of the gas;
  d. heating a rich aqua-ammonia fluid in a rectifier to liberate ammonia gas using one or a combination of trim heat or heat of compression recovered from step (a) if the gas is compressed in step (a), producing a lean aqua-ammonia fluid;
  e. subcooling the lean aqua-ammonia and circulating to the top of a vapour absorption tower;
  f. condensing the ammonia gas from the rectifier and flashing the liquid ammonia to produce chilled ammonia gas for use in the at least one absorption chiller;
  g. absorbing ammonia gas from the at least one absorption chiller into the lean aqua-ammonia in the vapour absorption tower to produce the rich aqua-ammonia for step (d).

The gas may comprise an industrial gas or a hydrocarbon gas, or any mixture of industrial or hydrocarbon gases. The method may result in the liquefaction of at least one component of the gas, a portion of the gas, or substantially all of the gas.

In another aspect, the invention may comprise a gas liquefaction system comprising a receiving stage for receiving an inlet gas at an inlet pressure, a chilling stage comprising an absorption refrigeration loop for chilling the received gas, and a liquefaction stage comprising a JT valve for at least partially liquefying the chilled gas. In one embodiment, the system may further comprise a compression stage for compressing the gas to the desired pressure, and a heat of compression energy recovery stage for transferring heat from the compression stage to the absorption refrigeration loop. In another embodiment, the system may comprise a gas recycle stage for recycling non-liquefied components of the gas in a low pressure vapour recycle loop, which loop further chills the compressed and chilled gas, and which is then directed to the compression stage.

In one embodiment, the absorption refrigeration loop comprises a rectifier and a vapour absorption tower.

BRIEF DESCRIPTION OF THE DRAWINGS

The invention will now be described by way of exemplary embodiments with reference to the accompanying simplified, diagrammatic drawings.

DETAILED DESCRIPTION OF PREFERRED EMBODIMENTS

Figure 1:
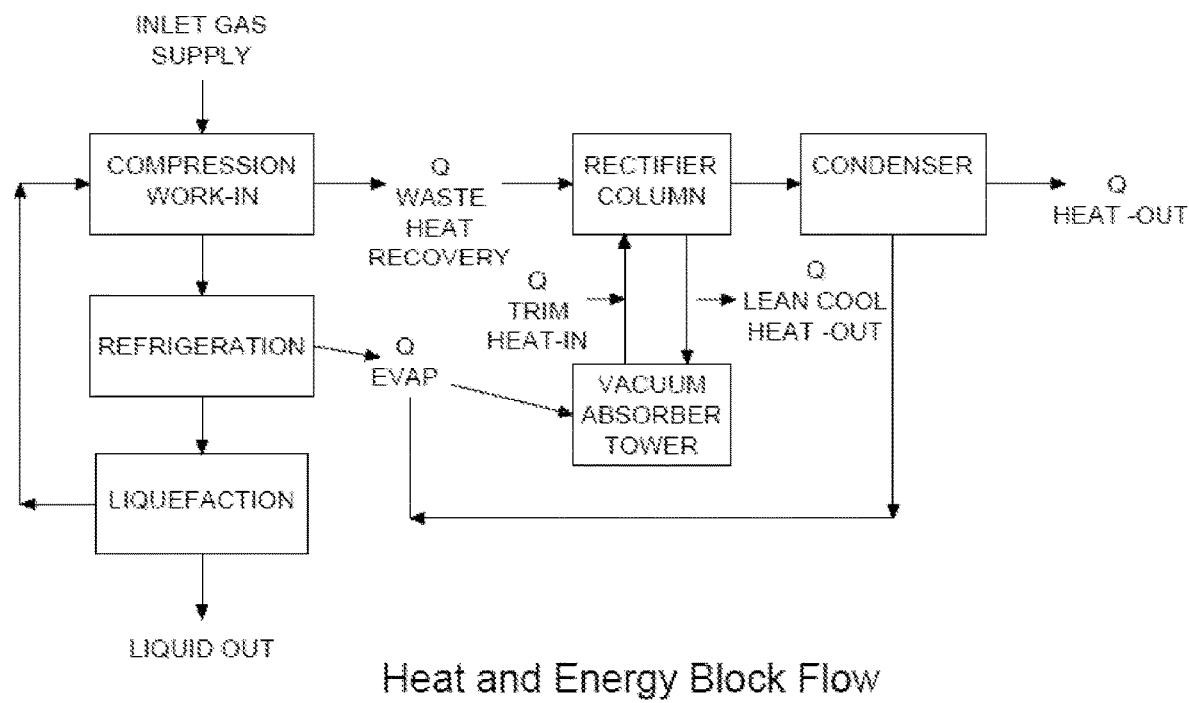
FIG. 1 is a schematic depiction of one embodiment of the present invention.

In physics, the term "gas" includes a state of matter where a substance has perfect molecular mobility and the property of indefinite expansion. As used herein, a "gas" include substances which are gases at standard temperature and pressure, such as $CO_2$, $H_2S$, $N_2$, $O_2$, $H_2$, He, Ar, air, or hydrocarbon gases such as methane, ethane, propane, ethylene and other hydrocarbon gases, or any mixture of gases. As used herein, the term "liquefied gas" means any gas or mixture of gases, that has been liquefied for sale, disposal or use for commercial, research or industrial purposes.

As used herein, the term "JT valve" or "JT throttling valve" means a gas valve adapted to allow the adiabatic expansion of gas in accordance with the Joule-Thompson effect. JT valves are well known in the art, and are commercially available.

As used herein, the term "low pressure separator" or "LPS" means a separating vessel that operates at a specified lower pressure and temperature downstream of a "JT" throttling valve, such that a liquefied gas can be removed from the flow path or processed further within the flow path.

As used herein, the term "high pressure separator" or "HPS" means a separating vessel that operates at the desired pressure for gas chilling and is located upstream of the JT throttling valve.

As used herein, the term "dense phase" as it relates to any gas or gas mixtures means the state of a gas resulting from its compression above its cricodenbar, which is the maximum pressure above which the gas cannot be formed into the gas phase, regardless of temperature, at a temperature within a range defined by approximately its critical temperature, which is the temperature corresponding to the critical point, being the combination of pressure and temperature at which the intensive properties of the gas and liquid phases of the matter are equal, and approximately its cricondentherm, which is the maximum temperature above which the natural gas cannot be formed into the liquid phase, regardless of pressure. In the dense phase, a gas has a viscosity similar to that of the gas phase, but can have a density closer to that of the liquid phase.

As used herein, the term "non-condensable" means any gas that does not liquefy at the operating pressure and temperature of a specific stage or stages for any LPS within the flow path.

As used herein, the term "absorption refrigeration process" or "ARP", means a refrigeration system that utilizes the art recognized thermodynamic refrigeration process that is based on thermal input to drive a refrigeration process.

As used herein, the term "trim heat" means heat input into a system originating from any means of waste heat recovery, heat transfer medium, electrical resistance heaters, or other conventional means of providing heat input to a modified ARP rich solution heating loop of the present invention. Trim heat is preferably supplied from low-grade heat sources. Low-grade heat means low- and mid-temperature heat that has less exergy density and cannot be converted efficiently by conversional method. Although there is no unified specification on the temperature range of low-grade heat, it is understood that a heat source with temperature below 370 C is considered as a low-grade heat source, because heat is considered not converted efficiently below that temperature using steam Rankine cycle. The main low-grade heat sources are from solar thermal, geothermal, and industrial waste thermal.

As used herein, the term "mechanical refrigeration process", means a refrigeration system that utilizes the art recognized thermodynamic refrigeration process that is based on compression input to drive the refrigeration process.

As used herein, the term "turbo-expander refrigeration process", means a refrigeration system that utilizes the art recognized thermodynamic refrigeration process that is based on adiabatic expansion and recovery of work for compression as a refrigeration process.

In one aspect, embodiments of the present invention comprise a system which comprises a gas receiving stage, a chilling stage, a liquefaction stage or stages, and a modified ARP which drives the chilling stage. In a preferred embodiment, the invention may also comprise a compression stage, a heat of compression energy recovery stage or stages, and a gas recycle stage. One embodiment of the present invention seeks to utilize the potential energy (enthalpy) of an inlet gas stream and to recover heat of compression energy during a compression stage of the liquefaction process to improve the overall thermodynamic efficiency of a gas liquefaction process.

In one embodiment, as shown schematically in FIG. 1, the invention comprises a gas liquefaction system which is combined with a modified aqua ammonia absorption refrigeration system. The heat of compression energy generated as a result of compression work on the gas or gas mixture to be liquefied may be recovered by utilizing aqua-ammonia to absorb heat from the working fluid gas stream by means of a heat exchanger. Conventional gas processing techniques reject this high quantity, low grade heat energy to the environment either through air fin fan or water cooling systems. Embodiments of the present invention utilize the recovered heat of compression energy in an absorption refrigeration cycle that provides refrigeration cooling to permit liquefaction of gases.

The potential energy (enthalpy) available in the gas to be liquefied is directly related to the pressure and temperature of the gas as it enters the system and is utilized during pressure reduction refrigeration processes such as the Joule-Thomson (JT) pressure reduction process to chill the gas or gas mixture by auto-refrigeration from adiabatic pressure reduction. The JT process is robust and simple and is suitable for refrigeration with no practical limitations on operating within the gas-liquid phase envelope, and does not require the use of specialty cryogenic rotating equipment which are complex, expensive, and have practical limitations requiring operation outside of the gas-liquid phase envelope.

With a source of heat, absorption refrigeration systems typically utilize less than 5% net electrical energy compared to the chilling energy produced by the absorption refrigeration system. Low grade heat of compression energy that is recovered from compression work imparted on the gas stream being liquefied can provide some, all, or excess refrigeration duty depending on the specific gas liquefaction application and the method employed for liquefaction. In applications where insufficient heat energy is available to be recovered from the liquefaction cycle, additional trim heat energy in the form of other available low grade waste heat streams and/or other conventional means of heat input may be required to provide the required heat energy to permit the required refrigeration duty to be developed by the absorber refrigeration system.

The absorption refrigeration system comprises a rectifier which uses heat energy to liberate ammonia from a rich aqua ammonia solution, and a vapour absorber tower (VAT), which in one embodiment, permits a chiller to operate as low as −71° C. at a 10 kPa operating pressure. The VAT design employs thermodynamic principals to eliminate the need for conventional mechanical vacuum pumps to achieve the desired vacuum operating pressures. The VAT design also permits at least some, and possibly all, recovery of the heat of solution and heat of condensation energy as anhydrous vapour ammonia absorbs into the lean aqua-ammonia solution at the top of VAT, and optionally, at additional entry points to the VAT. The solution strength and temperature increases from top to bottom in the VAT, with hydraulic head maintaining the aqua-ammonia solution in a subcooled state until the final rich solution strength is reached. The heat of solution and condensation are maintained as useful energy within the rich solution, unlike conventional absorbers which reject this energy to a heat sink.

In the receiving stage, the inlet gas stream is compressed or decompressed to a desired pressure, which may be above or below the critical pressure of the gas prior to starting the chilling/liquefaction process. If the inlet gas stream is above the desired pressure, it may be throttled with a JT valve to initiate the process at a lower temperature. In such cases, no heat of compression is recovered to transfer to the modified ARP.

In one embodiment, a method is adapted for liquefying a gas which has an inlet pressure below the critical point for the gas. The method utilizes a compressor (one or more stages), a heat of compression energy thermal recovery system, a modified ARP, one or more JT valves, one or more LPS vessels, and a recycle gas refrigeration compressor with one or more stages. This method of liquefaction of a gas reduces or eliminates the need for a second set of refrigeration compressors utilizing a conventional mechanical refrigeration system such as the Carnot cycle. The gas being liquefied acts as a heat transfer fluid as the vapour phase component as a result of the JT flash is recycled and the liquid phase component sent to storage. This example of the method may be suitable for liquefaction of $CO_2$, $H_2S$, propane, or shallow cut $C_3+$ natural gas liquid (NGL) recovery, where the required temperature for liquefaction is warmer than −70° C.

Figure 2A:
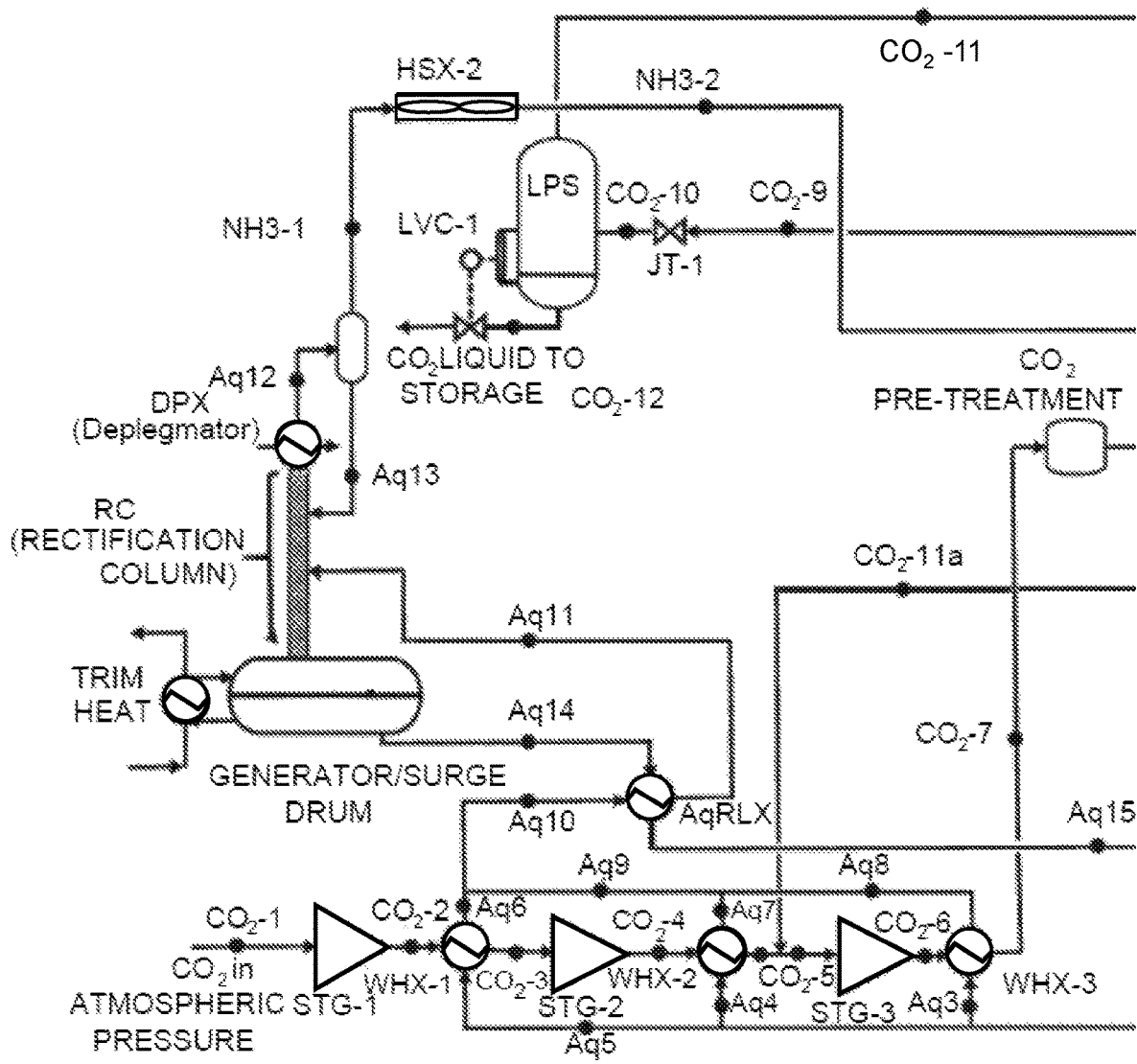
FIG. 2A and FIG. 2B, together, are a process flow diagram (PFD) of one embodiment, where the gas is compressed to less than the critical pressure for the gas.
Figure 2B:
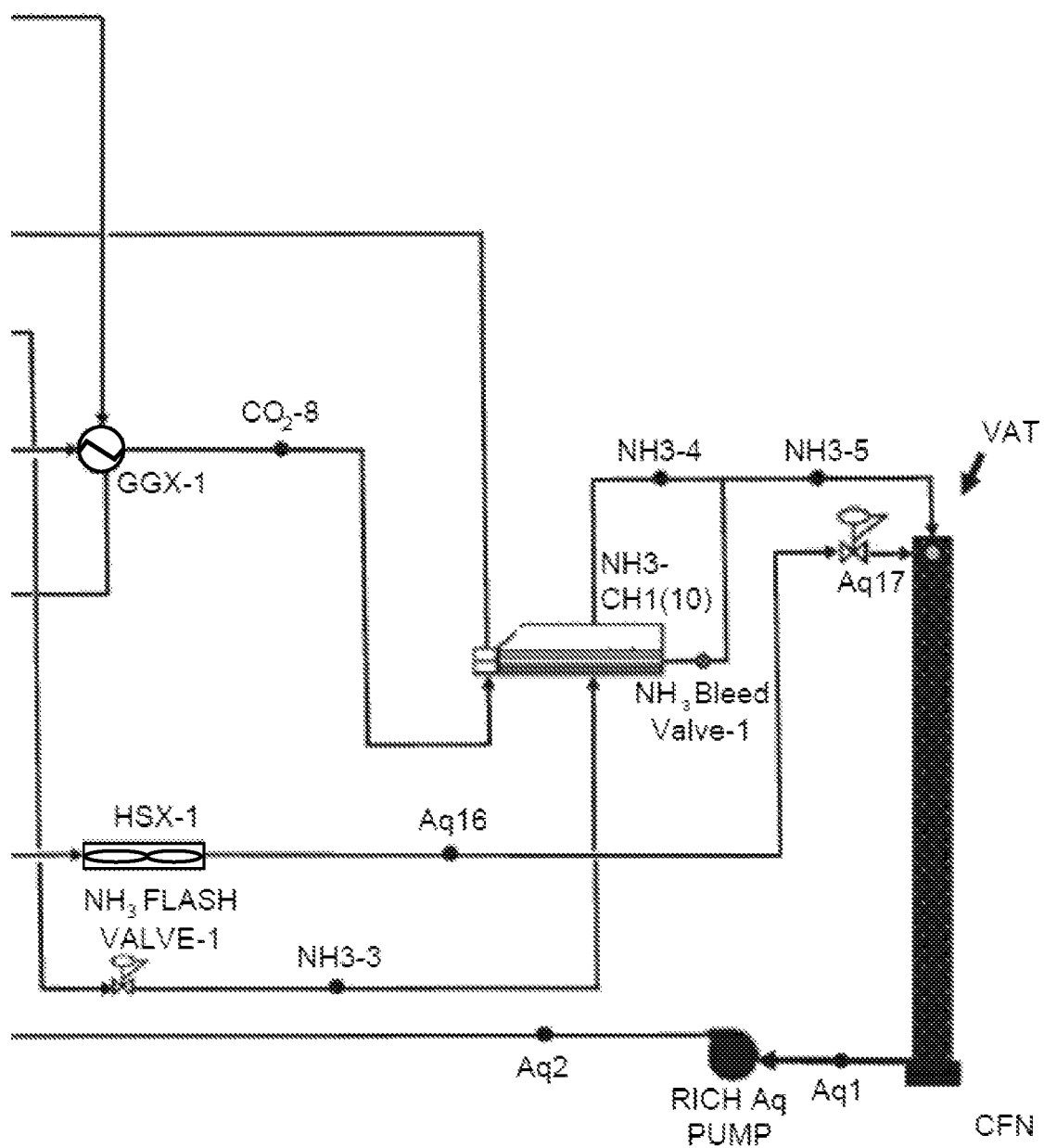
Figure 3A:
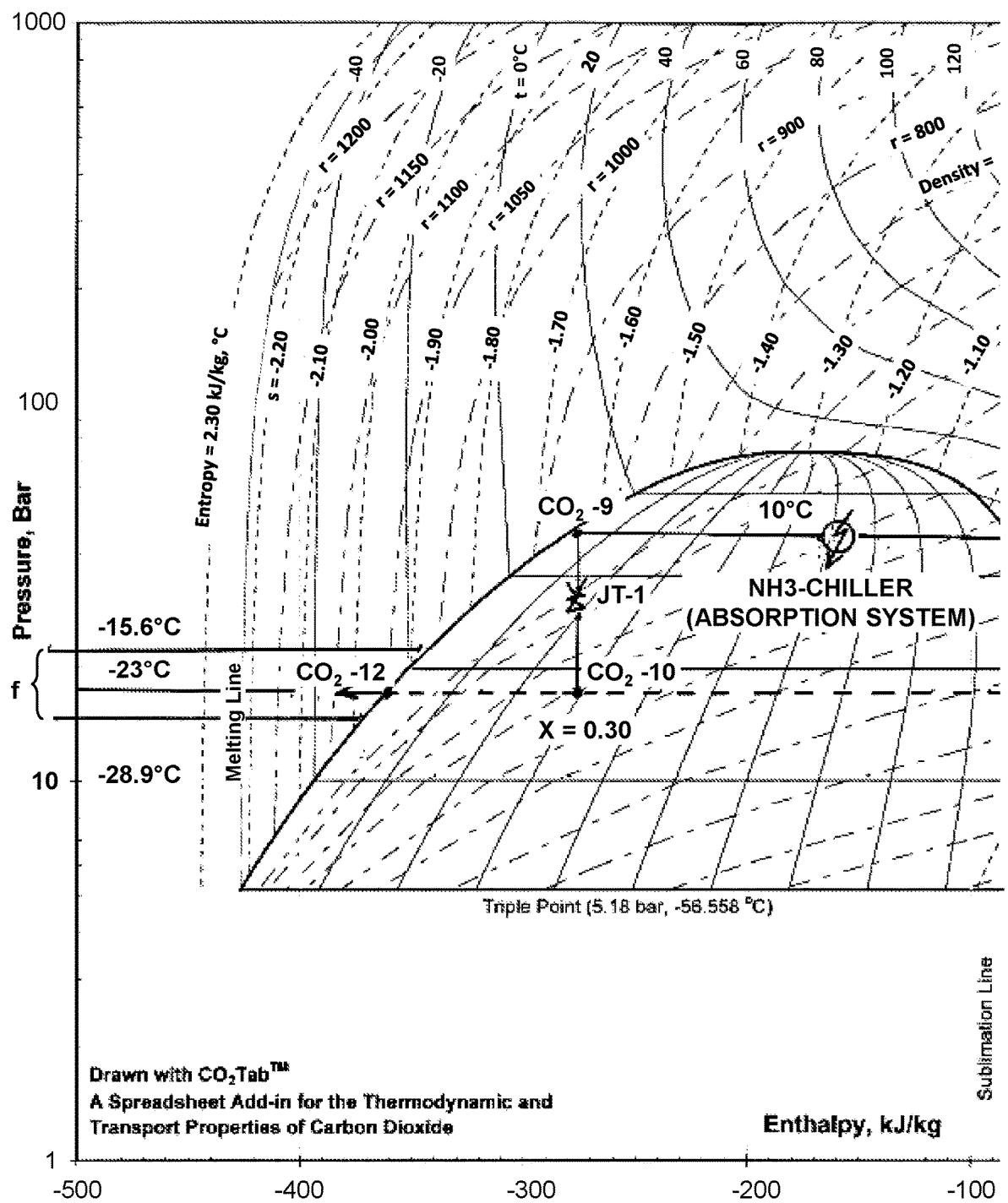
FIG. 3A and FIG. 3B, together, are a Mollier Chart for carbon dioxide ($CO_2$) utilizing one embodiment of the present invention. This and other Mollier Charts show specific Enthalpy-Pressure Charts as provided by Chemicalogic Corporation USA.
Figure 3B:
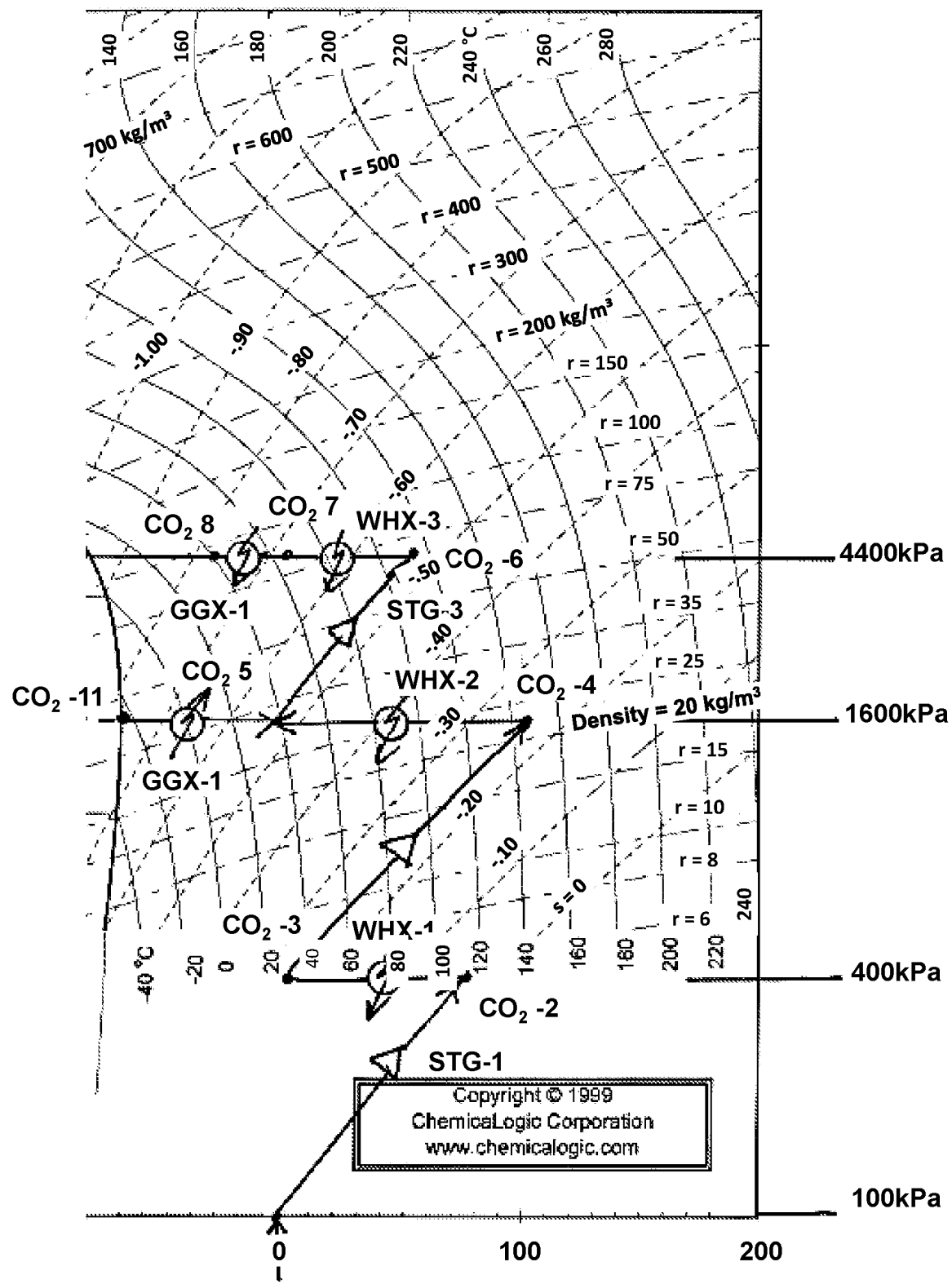

For example, this method may be used to liquefy $CO_2$ gas, shown schematically in FIG. 2A and FIG. 2B as a PFD, and in FIG. 3A and FIG. 3B as a Mollier Chart. Typical liquid $CO_2$ storage range is between about −15° C. and −29° C. The process may produce liquid $CO_2$ at a temperature of about −23° C., at a pressure of about 1600 kPa. At the inlet, $CO_2$ is delivered at an atmospheric pressure and at about 30° C., well below the critical point of the gas. The gas is then compressed in stages while passing through heat exchangers which recover the heat of compression energy with heat exchangers in direct communication with a rich aqua-ammonia solution, to provide all or a portion of the heat energy required to power the modified absorption refrigeration chiller system. The compressed $CO_2$ is then chilled by at least one absorption chiller. The heat energy for powering the absorption chiller system is provided by any combination of recovered heat of compression energy and/or trim heat, which may be produced by direct or indirect combustion heat exchange, or other available waste heat recovery streams with the necessary temperature and mass flow conditions.

The compressed and chilled $CO_2$ is then released through a JT valve into a low pressure separator (LPS) at a release pressure and a release temperature such that the $CO_2$ is in a two phase gas-liquid state, which may under some circumstances be in a sub-cooled state. Liquid $CO_2$ can be discharged to a storage vessel, while the gas portion comprising any flash gases and/or non-condensable vapours is directed to the recycle compressor, a bleed stream for venting, fuel gas and/or additional processing as the case may be. The recycle compressor is part of a recycle loop where the gas portion is introduced into the gas flowpath at the compression stage, as is seen in FIGS. 2A and 2B at CO2-11 and CO2-11a.

In another embodiment, the present invention provides a method for liquefying a gas which is received above its critical point, or is compressed to above its critical point utilizing a compressor (one or more stages), a heat of compression energy thermal recovery system, a modified ARP, one or more JT valves, one or more LPS vessels, and a recycle gas refrigeration compressor with one or more stages. The method utilizes a flow path including but not limited to a refrigeration cycle utilizing compression of a gas to a pressure sufficiently into the dense phase to permit liquefaction by means of cooling the dense phase gas with any combination of a heat of compression energy thermal recovery system, an absorption refrigeration system, and heat exchanger with the low pressure recycle gas vapour stream from one or more LPSs, one or more JT valves, and recycle gas refrigeration compressor with one or more stages of compression. Depending on the feed pressure and temperature of the gas entering the liquefaction process it may be advantageous to compress the gas further into the dense phase sufficiently above the critical pressure and temperature of the gas to optimize the heat removed (enthalpy change) during the chilling process for the specific gas or gas mixture to be liquefied.

The pressure selected for the chilling process for a specific gas or gas mixture is directly related to the slope change of the isotherm for the gas or gas mixture above the critical point as presented on a Pressure versus Specific Enthalpy Mollier Chart. The point at which the slope of the isotherm is vertical (infinite slope) provides the maximum potential for sensible heat transfer to occur for a given gas or gas mixture at a given temperature. The actual pressure selected may not necessarily be this point as a combination of factors are necessary to be considered such as practical pressure and temperature limits for compression and heat exchange equipment and the minimum temperature available or provided by the absorption chilling system. The slope of the isotherm for a specific gas can be observed on a Mollier Chart (X-axis Specific Enthalpy and Y-axis Absolute Pressure) to assist in selection of the optimum pressure for the chilling of a given gas or gas mixture prior to the liquefaction step. This selection process will be described further below.

In examples of this embodiment, the gas is received at an inlet pressure at a desired dense phase pressure, or if the inlet pressure is not at the desired dense phase pressure, compressing or decompressing the gas to the desired dense phase pressure required for liquefaction. If compressed, the heat of compression energy may be recovered by means of a heat exchanger and transferred to a rich aqua-ammonia solution, to provide all or a portion of the heat energy required to power the modified absorption refrigeration chiller system. If the heat energy recovered from the heat of compression is insufficient, trim heat may be provided by any direct or indirect combustion heat exchange, or other available waste heat recovery streams with the necessary temperature and mass flow conditions.

The inlet gas may be compressed in a single or multi-stage compressor as required to reach the desired final pressure, equal to the inlet pressure of the JT Valve. Generally, in one embodiment, the discharge temperatures for any particular compression stage is limited to about 150 to 160° C., depending on the specific compression equipment specifications.

The compressed gas is chilled by means of at least one, and preferably 2, 3 or 4 stages, absorption chiller to a minimum temperature of −70° C. In one embodiment, the compressed gas may be initially chilled with a low pressure vapour recycle stream from the LPS as discussed below.

The chilled industrial gas or gas mixture is released through a JT valve into a low pressure separator (LPS) at a release pressure and a release temperature such that the gas is at a vapour quality "X" within the two phase region for the gas. In FIGS. 6A and 6B, and 6C and 6D, X=0.53 at M17 and M12 respectively. The liquid is discharged from the LPS to a storage vessel and the vapour is directed to a low pressure vapour recycle stream. This recycle stream incorporates a heat exchanger that initially cools the dense phase industrial gas or gas mixture to the desired temperature prior to chilling the dense phase gas in the absorption chiller. The low pressure vapour recycle stream is thereby warmed to a temperature suitable for inlet to the compression equipment, and is then compressed in one or more stages until the desired dense phase liquefaction pressure is reached and then combined with the inlet gas stream.

Non-condensable vapours from the LPS may be directed to a bleed stream for venting, additional processing or as a fuel gas depending on the properties of the specific industrial gas or gas mixture and process application.

Additional stages for flashing of the liquid removed from the LPS may be conducted to further reduce the temperature and pressure of the liquefied industrial gas or gas mixture if desired with the use of additional JT valves, LPS vessels, and compression stages as desired.

For some gases, the absorption refrigeration chillers do not operate at a sufficiently low temperature to permit simple JT flashing of the chilled dense phase fluid to a sub-cooled state at the desired final liquefaction temperature, but does permit flashing to the desired final temperature and pressure to a certain vapour quality "X" within the gas-liquid phase envelope for the gas. The liquid portion is removed from the LPS and sent to a liquid storage vessel, while the gas phase is removed from the separator and the cold low pressure gas phase may be used to further cool the warmer dense phase gas stream which has been chilled in the final stage absorption chiller heat exchanger.

In one embodiment, by cooling the dense phase gas stream, the low pressure vapour recycle stream from the LPS is warmed to a temperature approaching the final absorption chiller operating temperature. It may then be directed to another heat exchanger which further warms the recycle gas in a compressor loop to a temperature acceptable for the selected recycle compressor equipment (−29° C. or warmer to utilize standard nodular iron or carbon steel materials and avoid the need for stainless steels necessary for cryogenic operations). Once the low pressure vapour recycle gas has exchanged sufficient energy and is suitably warmed it may be combined with the inlet gas stream and compressed as described herein.

Depending on the specific application, there may be excess chilling available for other processes, or there may be additional trim heat energy required to permit sufficient chilling duty to be generated by the absorption refrigeration chilling equipment. After the heat of compression energy has been recovered from the inlet stream and recycle stream (combined flow is equal to the inlet flow+recycle flow ("Y")), this stream is cooled further by one or more stages of the absorption chilling system until the desired final temperature from the absorption chilling system is reached. The low pressure vapour recycle stream from the LPS has a mass flow equal to "Y" or "X/(1-X)" times the inlet flow to be liquefied. The liquid mass flow leaving the LPS is equal to the inlet mass flow of the gas or gas mixture entering the system, less any fuel gas or bleed stream to prevent build-up of non-condensable gases at the desired system liquefaction conditions.

Methods of gas liquefaction described herein may minimize the need for additional equipment that are required by conventional refrigeration processes with cascaded multi-stage external refrigeration processes or mixed refrigerant systems that are currently utilized in large scale LNG liquefaction facilities and which require significant net energy input and capital to construct and working capital to operate and maintain. Additionally, brazed aluminium heat exchanger (BAHX) and cryogenic rotating equipment are not required.

Additional JT flash stages may be added if colder and lower pressure liquefied gas or mixed gas products are desired which result in additional recycle or gas bleed steams. Depending on the properties of the gas or gas mixture being liquefied, it may be desired to use one or a combination of the vapour streams for fuel gas or as a feed stream for recovery of the non-condensable gases in another liquefaction process at alternate operating pressure and temperatures that permit liquefaction of the non-condensable gas or gas mixtures. One example of this method is suitable for applications with liquefaction temperatures as low as −170° C. and is particularly suitable for LNG production or deep cut $C_2$+ recovery.

Methods described above which use a dense phase gas are capable of cooling a gas to a temperature of −71° C. prior to adiabatic expansion, which is sufficient to liquefy methane. In another embodiment, where the required liquefaction temperature is lower, the invention may comprise an additional cooling step, where the vapourization of a separate liquefied industrial gas further cools the gas desired to be liquefied. This method for liquefying gases utilizes a compressor (one or more stages), a heat of compression energy thermal recovery system, a modified ARP, one or more JT valves, one or more LPS vessels, a refrigeration recycle compressor with one or more stages, and one or more liquefied gas vapourizer heat exchangers.

In this embodiment, a liquefied gas is produced using the steps described above and further adds the step of utilizing an liquefied gas vapourizer heat exchanger to chill another dense phase gas from the final stage modified absorption chiller temperature to a sufficiently low temperature that the chilled dense phase gas can further be chilled with the recycle vapour stream from the LPS to permit liquefaction of the industrial gas or gas mixture by JT adiabatic expansion to a vapour quality "X" at the desired temperature and pressure. If LNG is used in the liquefied gas vapourizer, then approximately one kg of air may be liquefied for every 0.35 kg of LNG vapourized using an embodiment of the method illustrated in FIGS. 9, 10A, and 10B.

Accordingly, stages for alternative embodiments are similar but may differ in required operating temperature, pressures, and heat and material balances for the gas liquefaction applications. Solution concentration of the lean and rich aqua-ammonia solution concentrations and flow rates is dependant primarily on the ambient (heat sink temperature)

and desired final chiller stage operating temperature. Circulation rate of a given solution mix is dependent on total cooling load required and available heat input to the system. Calculation and determination of these parameters are well within skill of an ordinary skilled artisan having the benefit of this disclosure.

One feature of the present invention comprises the recovery of a significant amount and in some cases all of the heat of solution and heat of condensation energy in the VAT, which heat is rejected to the ambient environment or heat sink in conventional ARP configurations. Another feature of one embodiment of the VAT segment of the invention is that it may achieve very low −71° C. chilling in the final chiller stage with no requirement for rotating vacuum pump equipment, thus providing a simpler robust lower capital cost solution to achieve liquefaction of LNG with minimal rotating equipment, and in particular no cryogenic rotating equipment.

Examples

The following examples are described to illustrated specific embodiments of the claimed invention, and are not intended to limit the claimed invention.

Figure 4:
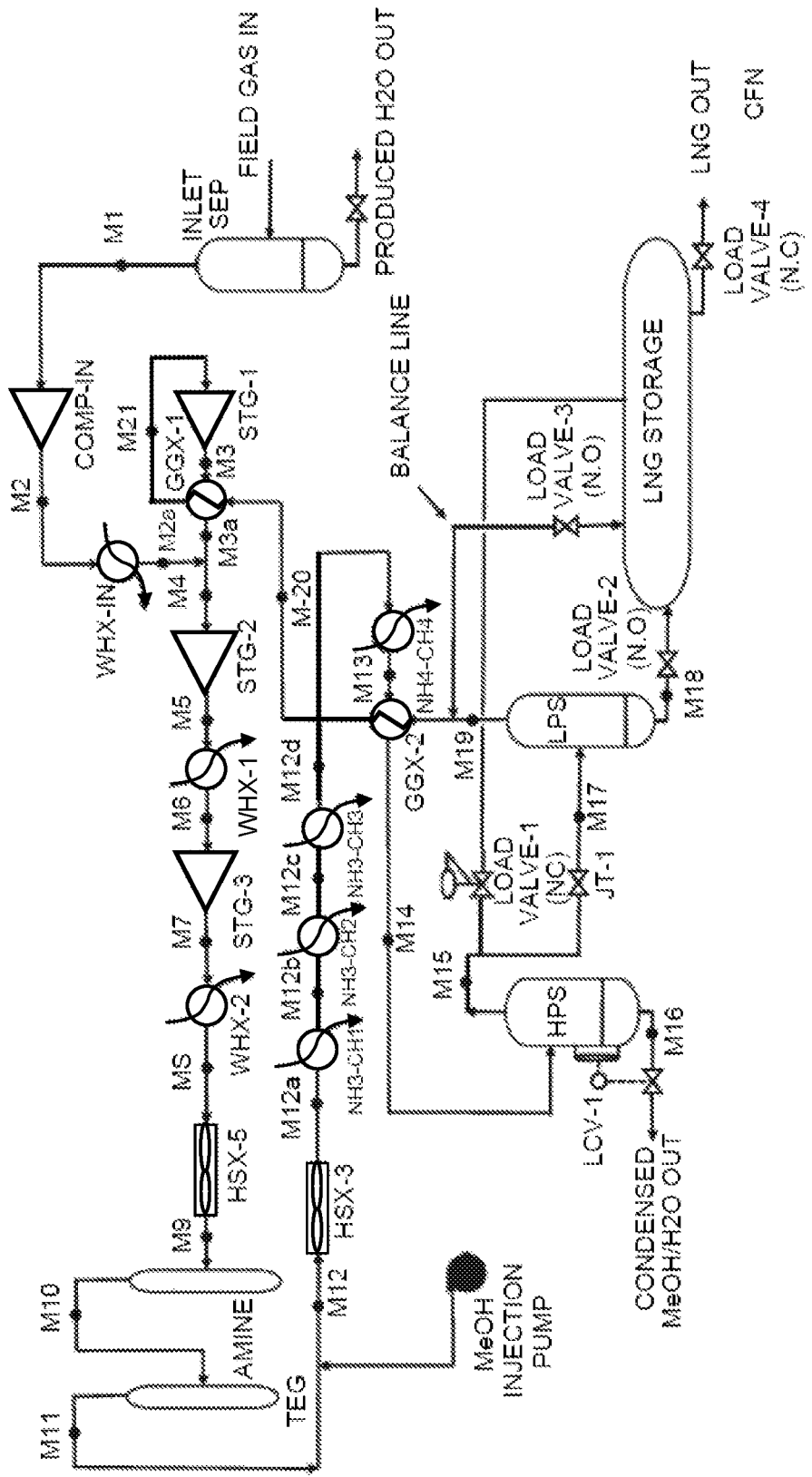
FIG. 4 is a process flow diagram (PFD) utilizing gas liquefaction method 2 for a sweet natural gas at 170 kPa inlet pressure, water saturated with 2% $CO_2$ and 98% $CH_4$. The liquefaction cycle uses a single flash liquefaction application to a storage of pressure of 170 kPa.
Figure 5A:
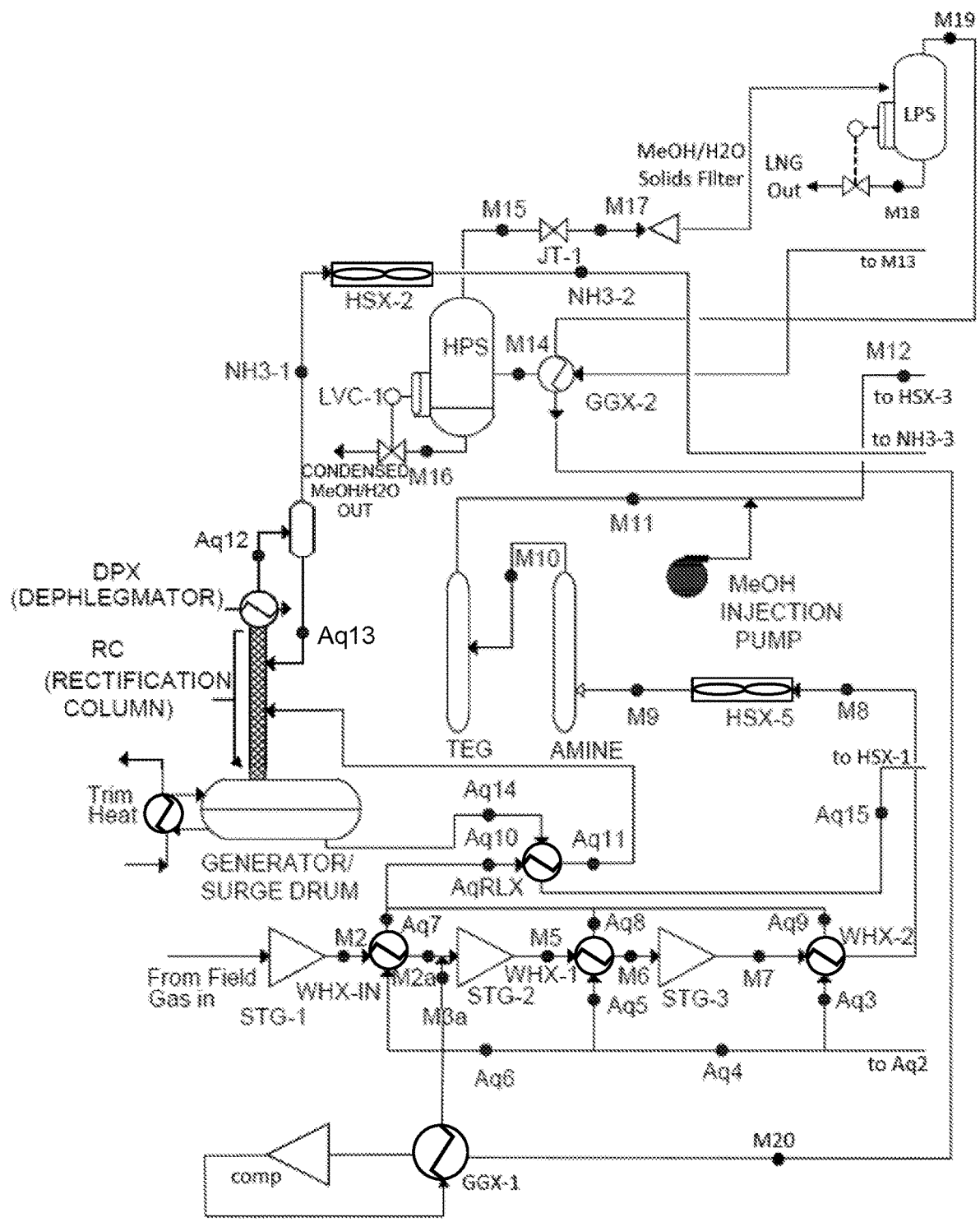
FIG. 5A and FIG. 5B, together, are a process flow diagram (PFD) utilizing the modified absorption refrigeration cycle noting key equipment and process data points. The process shows key components for 4 stage $NH_3$ chiller system, vapour absorber tower (VAT), lean solution chiller, waste heat exchangers, generator, rectifier column, reflux condenser (dephlegmator), ammonia condenser, and other ancillary equipment FIG. 6A and FIG. 6B, together, are a Mollier Chart for methane ($CH_4$) utilizing a liquefaction cycle showing one embodiment of the present invention.
Figure 5B:
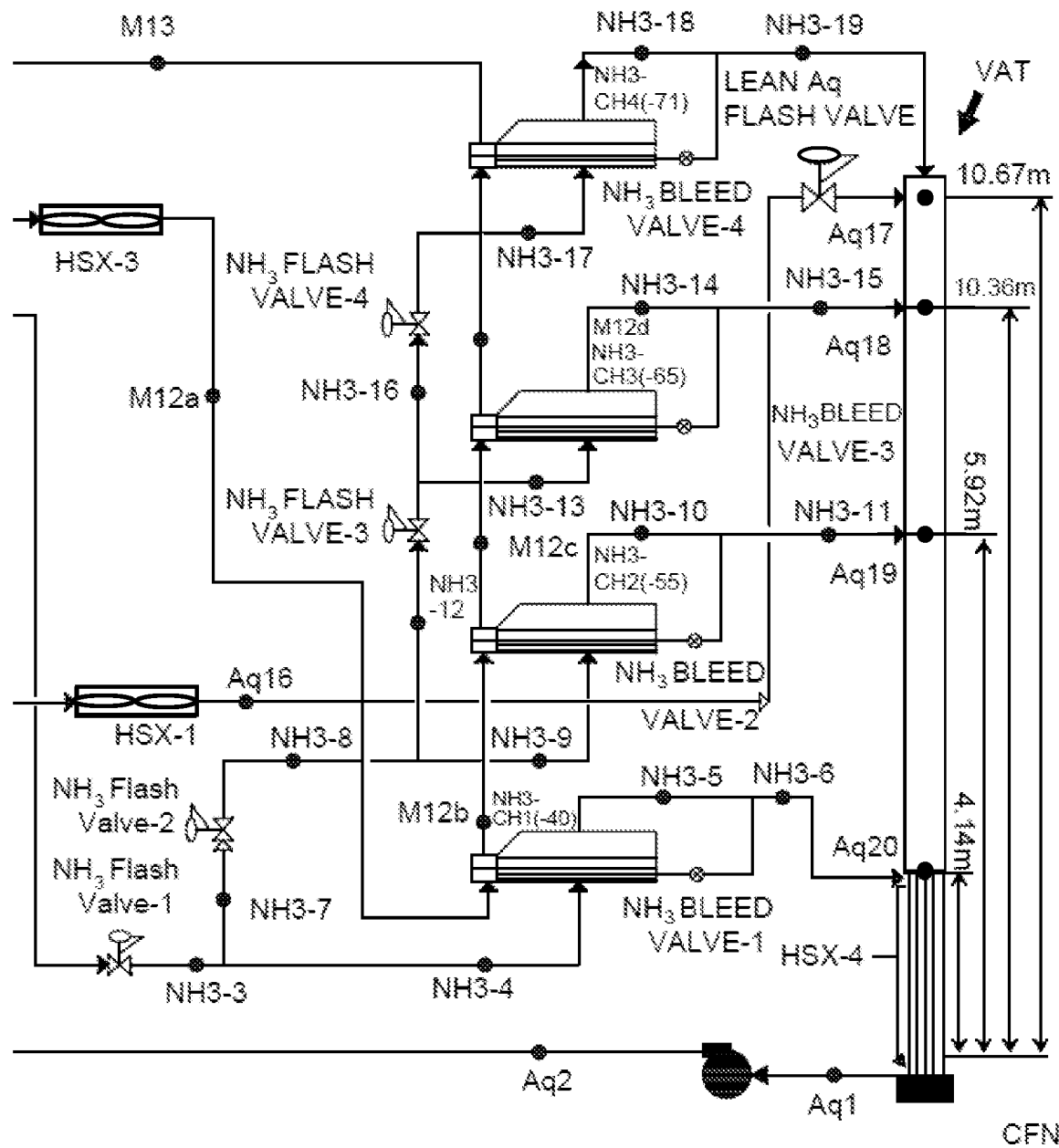
Figure 6A:
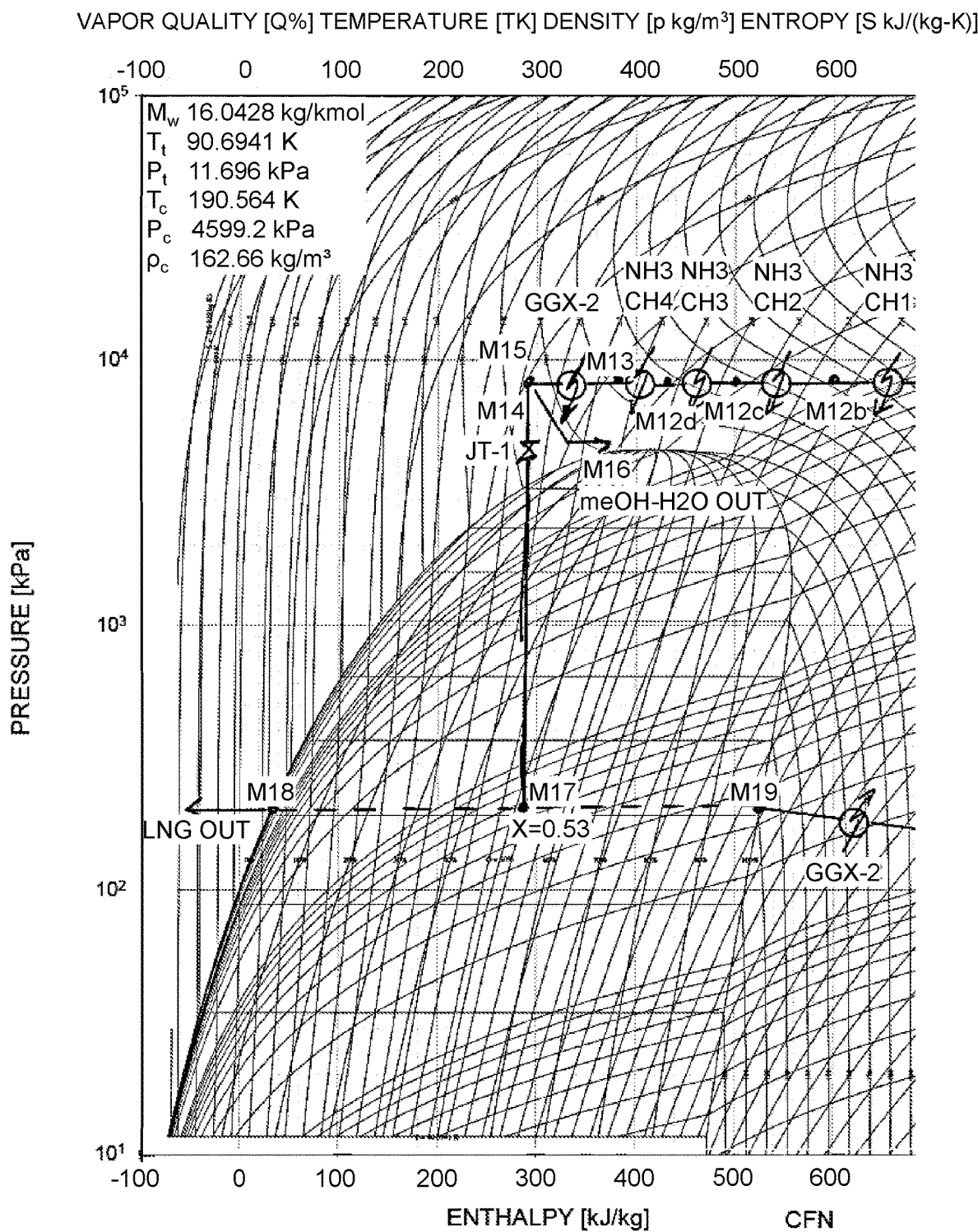
FIG. 6C and FIG. 6D, together, are a Mollier Chart for methane utilizing an alternative embodiment, with an optional high-pressure feed.
Figure 6B:
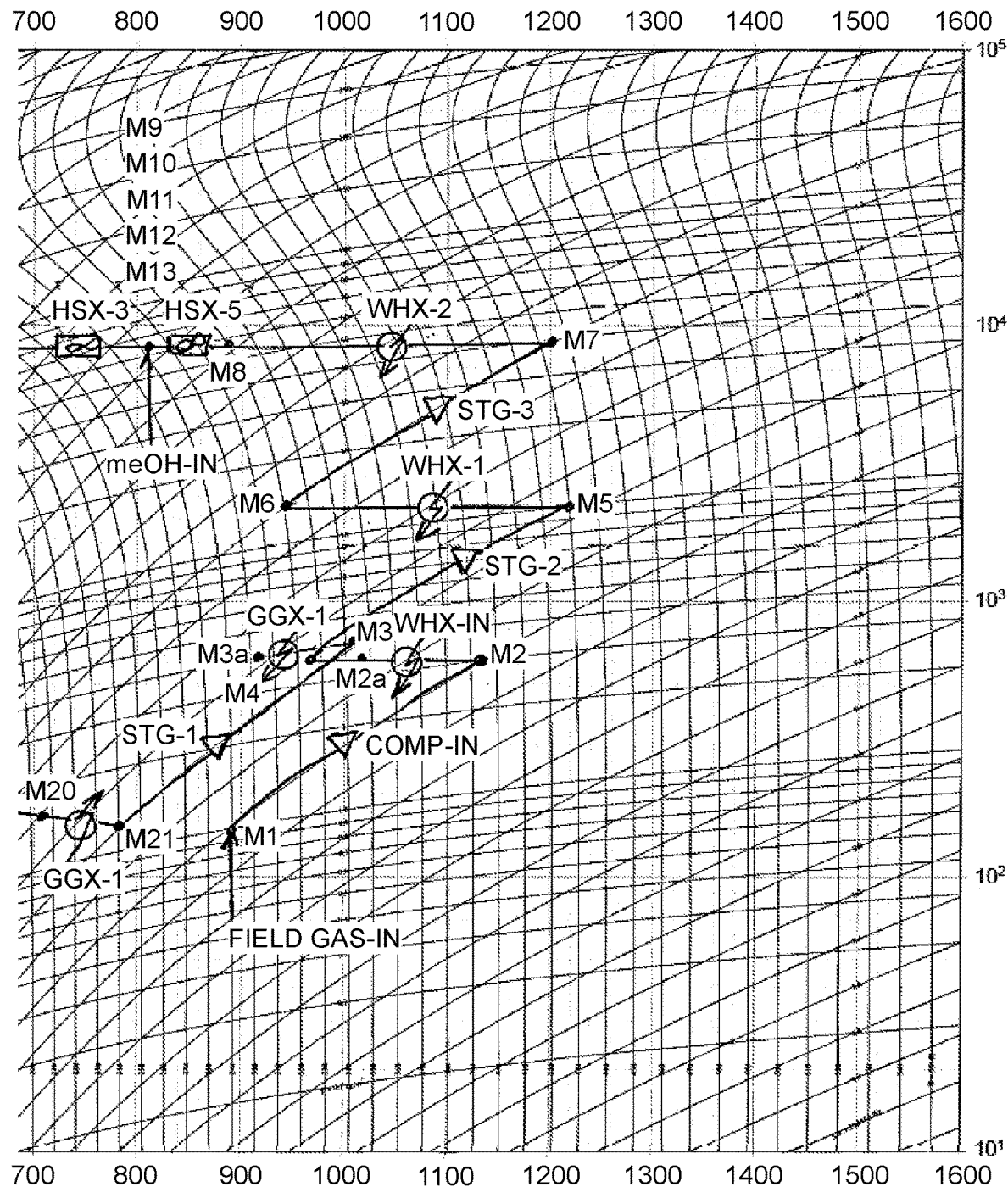
Figure 6C:
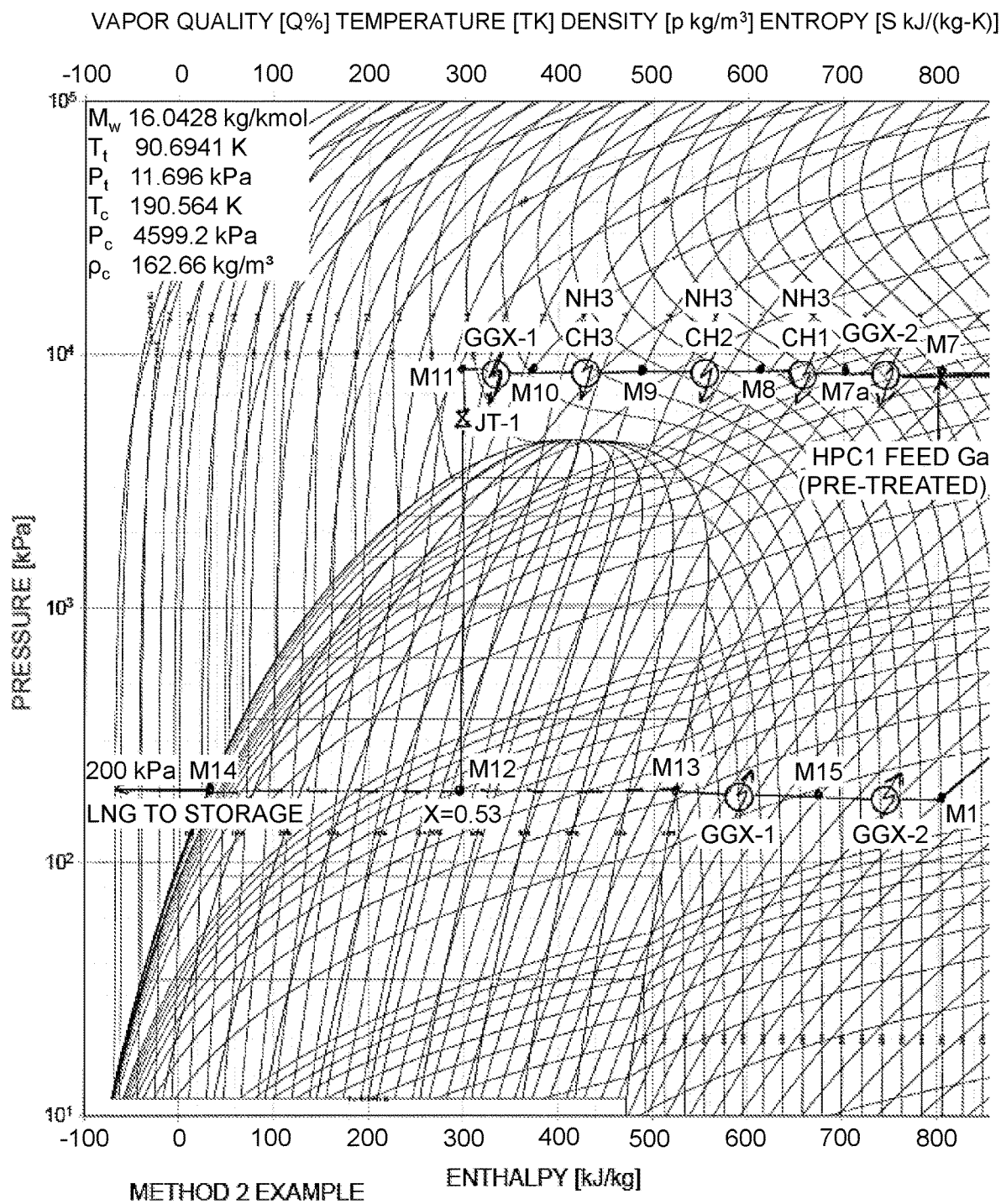
Figure 6D:
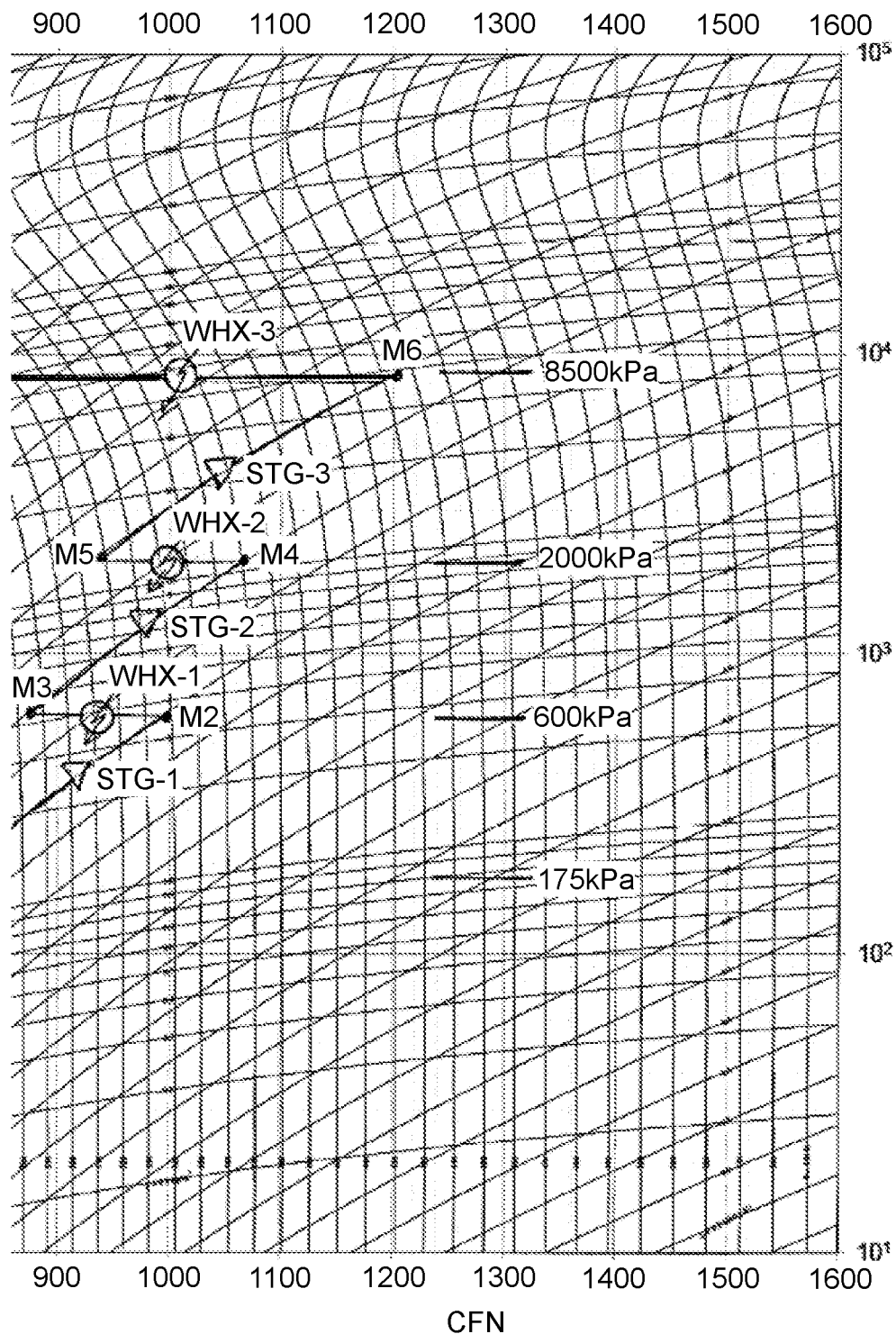

In FIGS. 2A, 2B, 3A and 3B, $CO_2$ gas is received at atmospheric pressure and at about 30° C., and is then compressed to a pressure of about 4400 kPa, through three stages of compression (STG-1, STG-2, and STG-3), while being cooled with heat exchangers (WHX-1, WHX-2 and WHX 3). The gas is then chilled initially by vapour recycle stream from the final separator (MP Sep) and then an absorption chiller (NH3-CH1(10)). WHX-1, WHX-2 and WHX 3 transfers heat to the aqua ammonia system, to power the absorption chiller system The chilled $CO_2$ then passes through a JT valve into the separator (MP Sep) at a release pressure and a release temperature such that the $CO_2$ is in the two phase gas-liquid, which may under some circumstances be in a sub-cooled state. The liquid portion is discharged to a storage vessel, while and the gas portion comprising any flash gases and/or non-condensable vapours is directed to the recycle compressor, a bleed stream for venting, fuel gas and/or additional processing as the case may be;

FIGS. 4, 5A and 5B shows PFDs shows a liquefaction method and system for liquefying sweet natural gas, while FIGS. 6A and 6B shows a Mollier Chart for the natural gas flowpath. Table 1 attached summarizes the heat and material balance for these examples.

Figure 8:
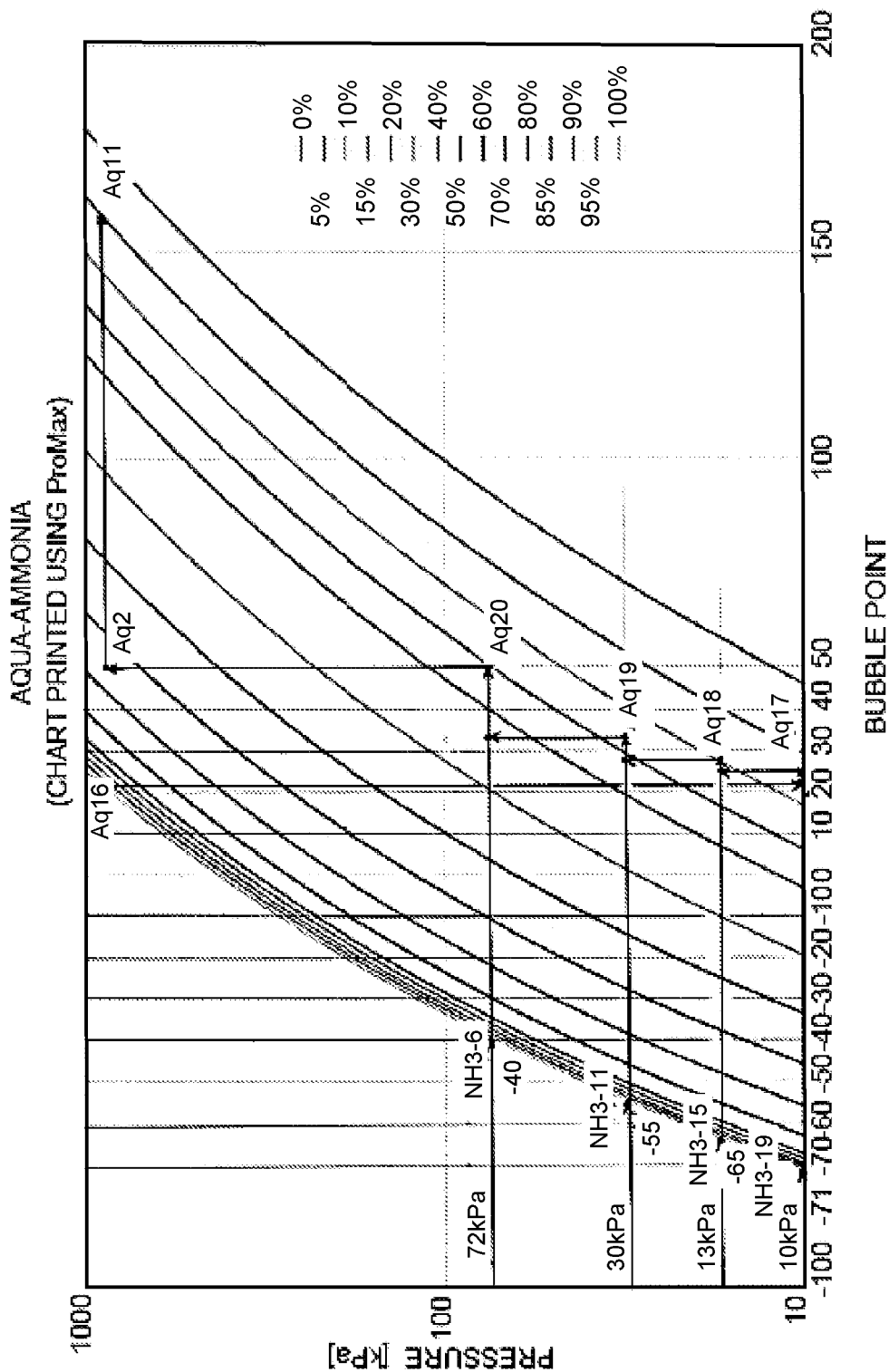
FIG. 8 is a PTX drawing for aqua-ammonia solution that represents the operating points, in particular the key process operating pressures, temperatures and solution concentration through the VAT and the remainder of the modified absorption cycle as utilized in the invention. The PTX graph for Aqua-Ammonia was plotted utilizing process data from PROMAX™ process simulator.

FIG. 8 depicts the flow path of the modified ARP and VAT on a PTX graph at pressures down to 10 kPa, developed in order to depict the flowpath of this example. Conventional PTX graphs for aqua-ammonia generally do not extend below 100 kPa and do not take into account operation of ARP systems operating below atmospheric pressure. FIG. 8 depicts the flowpath of the anhydrous ammonia 4 stage gas chilling system to permit operation at the top of the VAT at pressures as low as 10 kPa and −71° C. Table 1 summarizes the properties of the gas, methanol, aqua-ammonia solution, and anhydrous ammonia as they progress through the flow path obtained from available Mollier charts for methane and anhydrous ammonia, publically available tables, graphs and charts for the thermodynamic properties of aqua-ammonia solutions, vapour, and steam tables. Calculations for the expected performance and operating parameters for the modified ARP and VAT were developed by the inventor as part of the invention. The hand calculations are subject to rounding, simplification, estimating and approximation as necessary to develop the key parameters and key system operating parameters. For example, non-condensable gases were excluded and pure anhydrous ammonia was assumed to simplify the required hand calculations (versus target 99.5% purity). Mathematical simulation using process simulation software may result in refinement of calculations to permit detailed process design of required bleed streams for the gas liquefaction loop and the modified ARP and VAT system.

A method for the liquefaction of water saturated sweet natural gas (98% $CH_4$ and 2% $CO_2$) is shown in FIGS. 4, 5A, 5B, 6A and 6B. The natural gas is supplied into the flow path at an inlet separator at M1 at a pressure of 170 kPa and 17° C. The gas is compressed in the $1^{st}$ stage inlet (COMP-IN) and compressed to 650 kPa (M2) the same pressure as the first stage recycle gas (STG-1, M3). The heat of compression from the $1^{st}$ stage inlet is recovered in WHX-IN (M2 to M2a), the heat of compression from the first stage inlet is (M3 to M3a) is used to warm the recycle gas (M20 to M21) to at least −29° C. which is the minimum acceptable temperature for operation in a compressor of standard materials of construction (non-cryogenic). The combined temperature to the inlet of the suction of the $2^{nd}$ stage recycle compressor is 47° C. (M4). The temperature and pressure at M4 must reviewed to ensure that hydrates or freezing are not an issue, for this example there is not an issue but recycle ratios to inlet gas and water content can change depending on the application.

The combined inlet and recycle gas are compressed in the $2^{nd}$ recycle stage to 2,200 kPa (M5), the gas is cooled and the heat of compression recovered in WHX-1 (M5 to M6). The gas is further compressed in the $3^{rd}$ stage recycle (STG-3) and heat of compression recovered starting at 160° C. in WHX-2 (M7 to M8) to 47° C.

The gas now enters a point in the flow path for pretreatment in preparation of the liquefaction process. HSX-5 is utilized to provide control of the temperature in advance of the gas in the flowpath entering the Amine Contactor (M9) where the $CO_2$ content is reduced from 20,000 ppm to less than 50 ppm to prevent solidification of $CO_2$ in the liquefaction process. The gas exiting the amine contactor at point M10 is water saturated as it enters the TEG glycol dehydrator, where exiting at point M11 the water vapour content has been reduced to 0.065 kg/$10^3$ m$^3$. At point M12, 11.7 kg of methanol is injected to ensure a roughly 75/25 methanol/water mixture as condensation occurs along the flowpath to the HPS at 8,200 kPa and −88° C. (M14). The condensed methanol and water mixture is removed from the HPS (M16) leaving a dehydrated vapour stream with trace amounts of MeOH/$H_2O$ that will solidify as the gas is flashed across the JT-1 valve to 170 kPa and −152° C., and can be removed by filtering the liquid product. This technique for dehydration has not been utilized or recognized in prior art as a method of dehydration of the gas stream during the production of cryogenic gases such as LNG and is a method that may be utilized in the invention to eliminate the need for conventional molecular sieve dehydration units.

Returning to M12 the point in the flowpath for methanol injection the gas is sequentially cooled from 22° C. (M12) to −88° C. (M14) via ammonia chillers $NH_3$—CH1, $NH_3$—CH2, $NH_3$—CH3, $NH_3$—CH4, and GGX-2. In this example, due to the warmer ambient temperature, HSX-3 does not provide any beneficial heat transfer duty. In colder climates, HSX-3 may provide significant cooling, which will reduce the chilling duty of NH3-CH1. As a result, thermal efficiency of the gas liquefaction process will improve as the ambient temperature declines during winter months.

Once the chilled dense phase gas has reached the HPS, the condensed MeOH/H$_2$O liquid is removed at point M16 as noted previously, the dehydrated chilled high pressure gas leaves the HPS at point M15 (−88° C., 8,200 kPa) and is flashed across the Joule Thomson valve JT-1 to point M17 (170 kPa, −152° C., and a vapour fraction X=0.53) into the LPS. The liquid LNG is removed from the LPS via M-18 by gravity to the LNG storage system (with trace MeOH/H$_2$O solids filtered and removed from the LNG), and the cold recycle gas vapour is recycled back to act as a heat transfer fluid, cooling the gas stream in GGX-2 (M13 to M-15) and warming from M-19 to M20 (−152 to −71) the close approach temperatures are obtained utilizing a high pressure cryogenic heat exchanger. The recycle gas is further warmed in GGX-1, a lower pressure cryogenic heat exchanger to a minimum of −29° C. to permit the use of non-cryogenic compression equipment, which may be either reciprocating or centrifugal as the size of the gas liquefaction plant increases.

The rich solution is received at the inlet to the rich aqua-ammonia solution pump at point Aq1 from the bottom of the VAT in a subcooled state of 50° C. or less and 10.4 wt % for this application. Warmer ambient conditions versus cold winter ambient conditions result in lower overall rich and lean solutions being utilized for the modified adsorption ARP. In this example the lean concentration is 5 wt % and the rich is 10.4 wt %.

The VAT receiving anhydrous ammonia vapour from the four gas chillers (NH$_3$—CH1, NH$_3$—CH2, NH$_3$—CH3, NH$_3$—CH4) in this example operates at 10 kPa at the top and a lean solution subcooled temperature of 22° C.

Generally as colder ambient temperature or heat sinks are available the chiller duty for NH$_3$—CH1 duty is reduced, in this example as the HSX-3 cannot reduce the flowpath temperature at M12a below 22° C., it's duty is minimal. Lower ambient temperatures also result in the condensing operating pressure of HSX-2 (anhydrous ammonia condenser) being reduced. The sensitivity of the reduction in ambient temperature on the modified ARP and VAT can be seen graphically on FIG. 8 (the PTX diagram for absorber operating pressures down to 10 kPa). Lower ammonia condensing pressure (HSX-2) and reduced duty load on the lean aqua-ammonia solution (NH3-CH1) provide opportunities to further optimize rich and lean solution strengths and circulation rates.

Returning to the rich aqua-ammonia solution pump, the discharge pressure of the pump is a direct function of the condensing temperature (and pressure) of the ammonia condenser (HSX-2). In this example 950 kPa pressure is required for Aq-2, the 10.4 wt % rich solution at this point in the flow path is subcooled. The rich solution flows first to the heat of compression recovery step splitting in parallel with flow rates split proportionate to the waste heat recovery duty of each exchanger (WHX-IN, WHX-1, WHX-2) rising in temperature from 50° C. (Aq2) to 72.5° C. (Aql10) at 10.4 wt % and 940 kPa the rich solution is still subcooled.

The next point in the flow path is the rich/lean solution exchanger where the rich solution is further heated to 143° C. at which point Aq12 the rich solution enters the modified ARP rectifier column.

As a result of the operating pressures at the 22° C. condensing temperature (HSX-2), the modified ARP system for this example is calculated to have a trim heat requirement of 924 kW, which can be supplemented from available low grade waste heat recovery streams, but requires an ultimate final temperature of 159° C. to achieve the lean solution concentration of 5 wt %. The additional waste heat could be supplied directly to the generator/surge vessel or along the rich solution heat exchanger heating loop.

Once sufficient additional trim heat is provided the required reflux and vapour traffic will be achieved in the rectifier column. The dephlegmator DPX requires 436 kW of cooling duty to achieve a 50° C. exit temperature which results in an ammonia stream that is anticipated to be 99.5 wt % ammonia based on the assumed reflux ratio of 2 and a lean saturated solution strength of 5 wt % (Aq14).

The lean solution Aq14 is subcooled in the lean rich solution exchanger and the temperature is reduced from 159° C. to 85° C. (Aq15). The lean solution is further cooled in HSX-1 to 22° C. in this example at point Aq16 in the flow path. The subcooled 5 wt % lean solution is injected into the top of the VAT column approximately 10.6 m elevation higher than the Rich Aq pump suction. The lean aqua-ammonia solution at 5 wt % is subcooled at 22° C. to permit the ammonia from NH3-19 in the flow path (at −71° C. and 10 kPa) to fully dissolve in the subcooled lean solution and to remain in a subcooled state after accounting for the rise in temperature from heat of solution and heat of condensation energy and enthalpy mixing of the ammonia vapour and lean solution.

The 10 kPa operating pressure is developed by pinching the lean aqua-ammonia flash valve thereby reducing the pump suction pressure of the rich aqua-ammonia pump but maintaining the suction pressure above the NPSHR and a subcooled lean solution to ensure absorption of the anhydrous ammonia vapours.

Returning back to the point in the flow path where the ammonia vapour (NH3-1) exits the top of the DPX, the vapour continues to the ammonia condenser (HSX-2). It is the condensing temperature of this heat exchanger that sets the operating pressure for the rich solution side of the modified ARP. The HSX-2 removes 230 kW to condense the required ammonia vapour flow for this example.

Figure 7A:
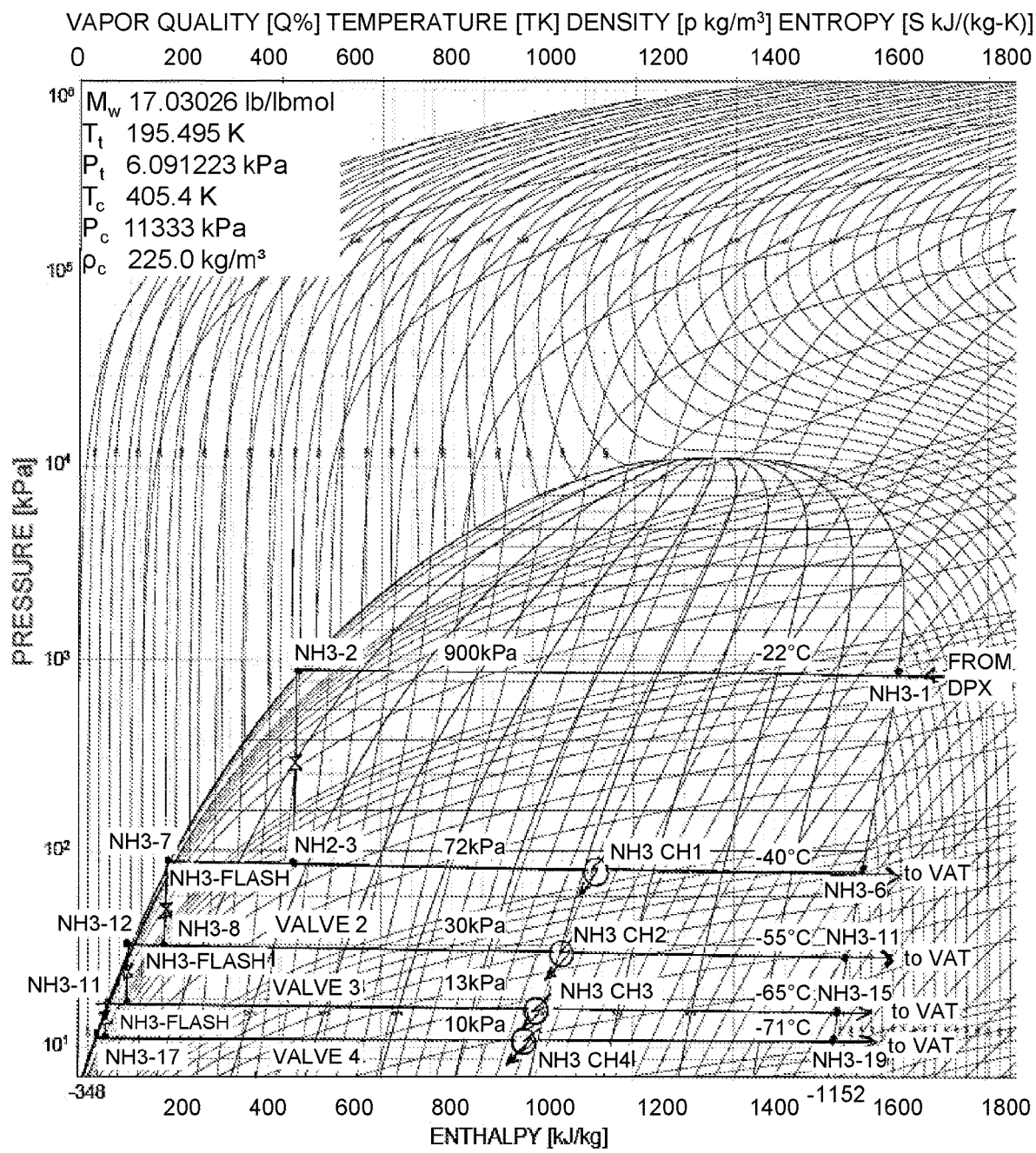
FIG. 7A and FIG. 7B, together, are a Mollier Chart for anhydrous ammonia ($NH_3$) which shows the thermodynamic points for a 4 stage liquefier chiller system which show the pressure and temperature of the anhydrous ammonia vapour as it returns to the VAT. Ambient cooling system temperature for this example assumes a condensing temperature of 22° C.
Figure 7B:
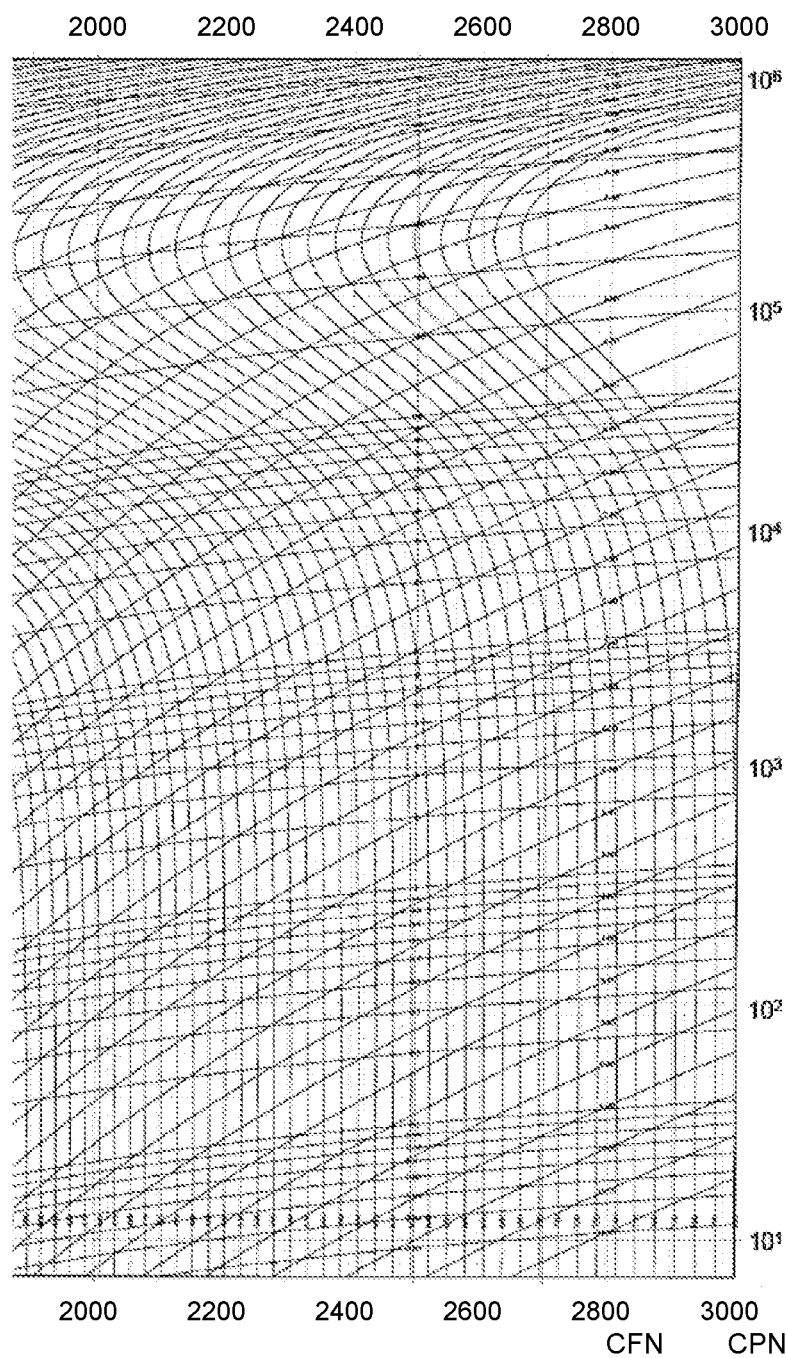

After NH3-2, the ammonia is fully condensed and FIGS. 7A and 7B, the anhydrous ammonia Mollier Diagram, details the thermodynamic aspects of this portion of the invention. The ammonia is at 900 kPa for the 22° C. condensing pressure and is flashed to the corresponding pressures for the 4 chillers as shown in the PFD for the modified ARP and VAT aspects of the invention. Shown on FIGS. 5A and 5B associated with the ammonia chillers are NH$_3$ Bleed Valves 1, 2, 3 and 4. For the purposes of simplified hand calculations in this example, bleed streams are not utilized. However, in practice a bleed stream of approximately 5% may be required for each ammonia chiller to prevent a build-up of H$_2$O in the ammonia chillers, which may render the system non-functional. The actual bleed stream will depend on the purity of the ammonia produced from the rectifier column, which for this example was targeted for 99.5% purity.

At the top of the VAT, the ammonia entering the VAT is at a height, temperature, mass flow rate that results in the aqua-ammonia solution increasing in strength and temperature as the solution flows down the VAT. As in shown on FIG. 8, the PTX chart the solution remains subcooled in this example for flows NH3-19 (Aq17 24.6° C., 10 kPa, 5.5 wt %), NH3-15 (Aq18 28.1° C., 13 kPa, 6.2 wt %), NH3-11 (Aq19 34.1° C., 30 kPa, 7.3 wt %), and NH3-6 (Aq20, 49.8° C., 72 kPa, 10.4 wt %) for the four gas flowpath chillers. If a superheated solution were to occur at the lowest mixing point (Aq20), a heat exchanger HSX-4 could be employed to remove excess heat to subcool the rich aqua-ammonia solution prior to pump suction (Aq1) to maintain the desired operating pressures at the top of the VAT.

Figure 9:
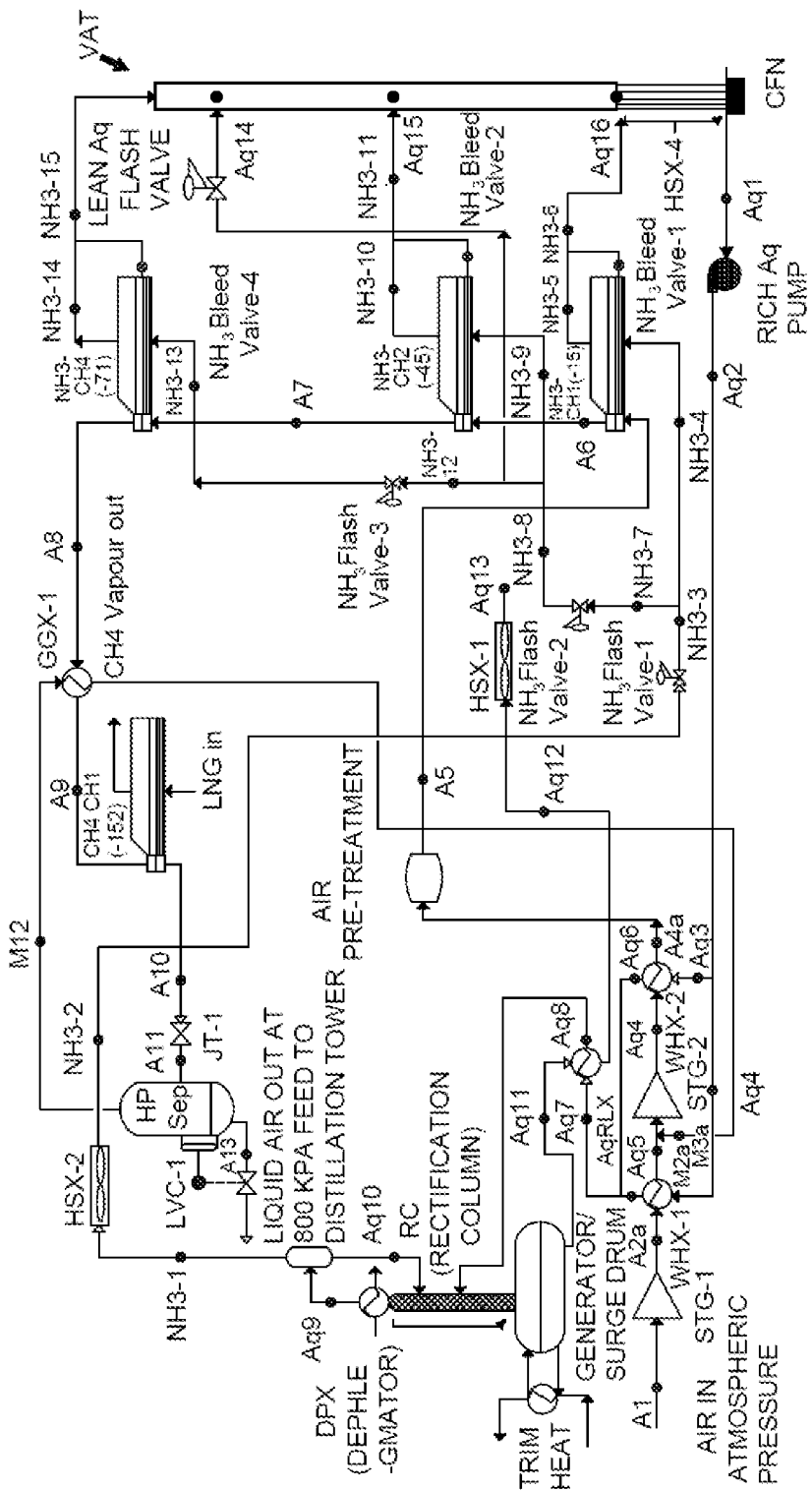
FIG. 9 is a process flow diagram (PFD) of one embodiment, where the final gas liquefaction cooling occurs in a liquefied gas vapourization heat exchanger.
Figure 10A:
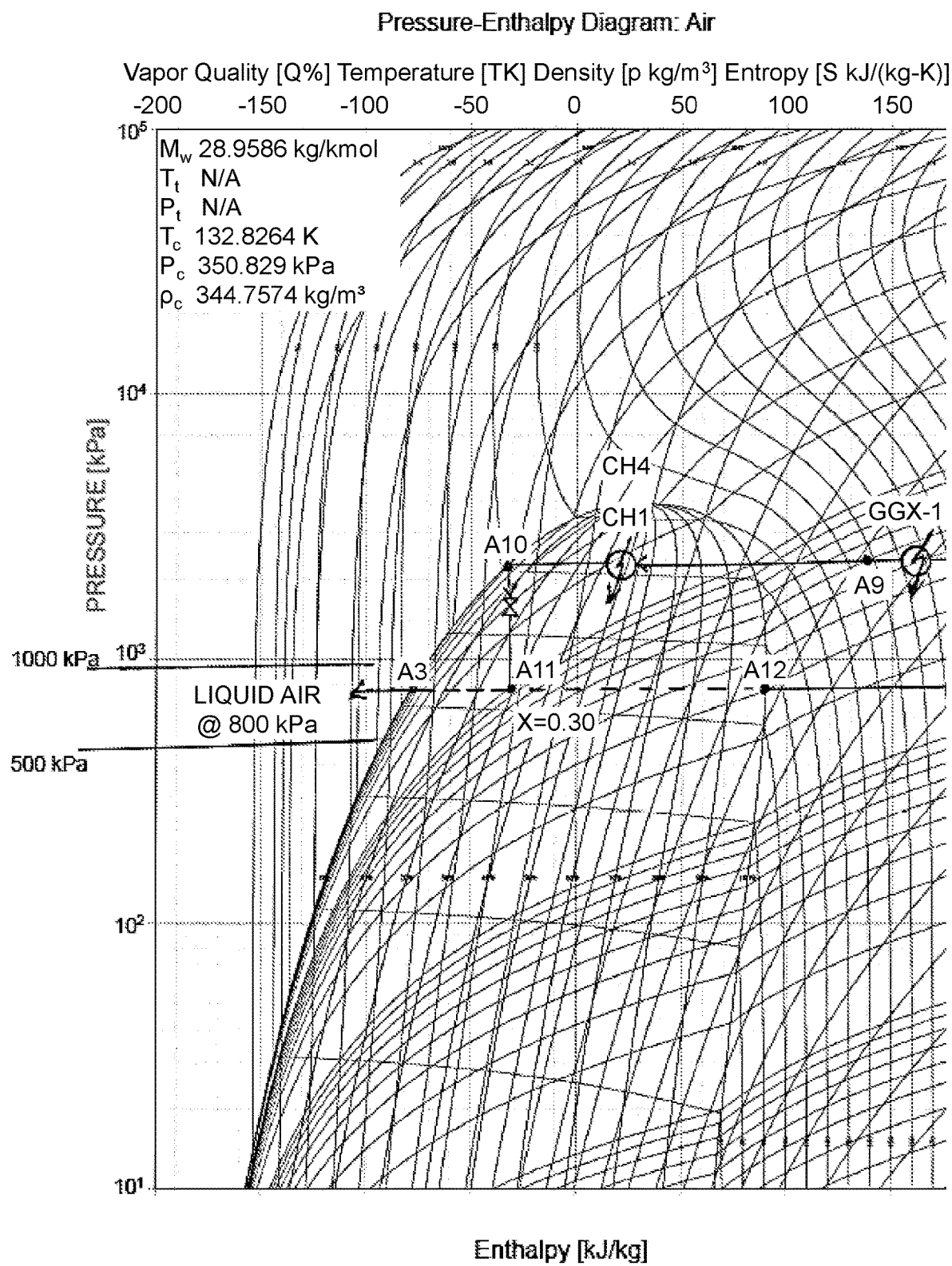
FIG. 10A and FIG. 10B, together, are a Mollier Chart for the liquefaction of air utilizing one embodiment of a liquefaction cycle as shown in FIG. 9.
Figure 10B:
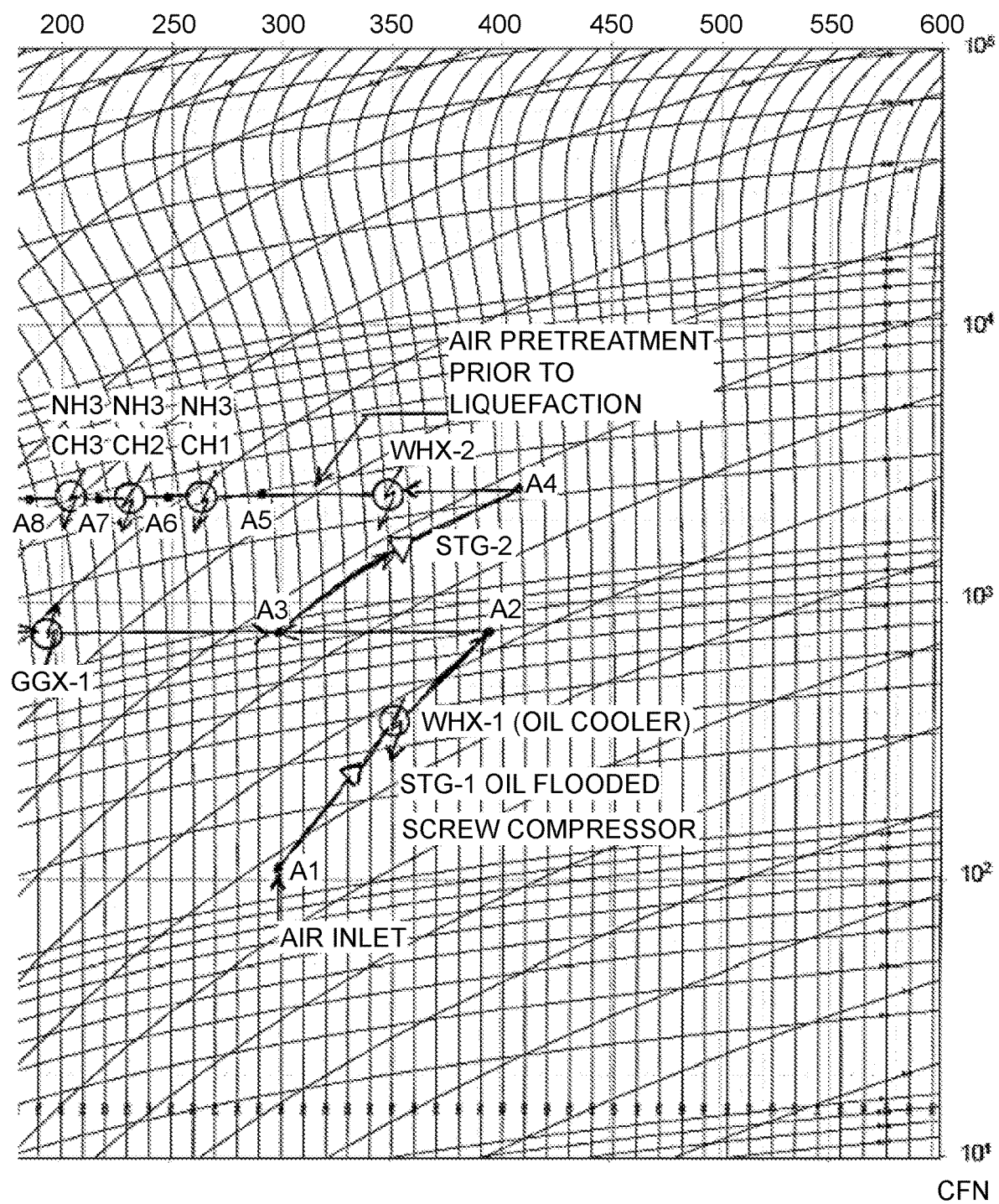

In another example, shown in FIGS. 8 and 9 which illustrate the liquefaction of air, the inlet gas is delivered at a pressure below the critical point. Liquefied air is produced by utilizing a liquefied gas vapourizer to provide additional cooling in the flow path downstream of the final stage absorber chiller (which operates at −70° C.) in order to permit a temperature and pressure condition to be reached that results in a flashed gas or gas mixture at the desired temperature and pressure to be within the gas-liquid phase envelope at a certain quality "X".

For example, natural gas may be liquefied using the methods described above, and then the LNG could be vapourized to provide additional chilling to the air stream beyond the chilling provided by the final chiller stage of a modified absorption chilling system. The vapourized natural gas may then become the feed for the LNG liquefaction loop utilizing an alternative embodiment as described above, or as a source of gaseous fuel if the air liquefaction plant was co-located on a site utilizing LNG as a source of fuel. This method may be suitable for liquefaction of a gas requiring very low temperatures (lower than −170° C.) to enable liquefaction to occur, and minimize additional equipment that is required by conventional refrigeration processes with cascaded multi-stage external refrigeration processes.

Definitions and Interpretation

All references to temperatures and pressures in the description herein should be considered to be modified with the term "about", which means a variation of ±5%, ±10%, ±20%, or ±25% of the value specified. For example, "about" 50 percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment described. The term "about" may also reflect any imprecision in instruments, devices or methods used to measure the value specified.

As will be apparent to those skilled in the art, various modifications, adaptations and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

TABLE 1

| Stream Name - Liquefier - Methane Loop | M1 | M2 | M2a | M3 | M3a | M4 | M5 |
|---|---|---|---|---|---|---|---|
| Pressure (kPa) | 170 | 650 | 600 | 650 | 600 | 600 | 2200 |
| Temperature (° C.) | 17 | 123 | 65 | 69 | 32 | 47 | 157 |
| Density Vapor (kg/m3) | 1.02 | 3.3 | 3.25 | 3.9 | 4 | 3.7 | 10.5 |
| Density Liquid (kg/m3) | | | | | | | |
| Vapor Fraction | 1 | 1 | 1 | 1 | 1 | 1 | 1 |
| MeOH (wt % of liquid) | 0 | 0 | 0 | 0 | 0 | 0 | 0 |
| Enthalpy (kJ/kg) | 892 | 1140 | 995 | 1005 | 920 | 955 | 1220 |
| Approximate Mass in kg with 28.3 e3m3/d -inlet | | | | | | | |
| C1 (0.98 mol vol dry) (kg/d) | 18500 | 18500 | 18500 | 20860 | 20860 | 39360 | 39360 |
| C02 (0.02 mol vol dry) kg/d) | 575 | 575 | 575 | 0 | 0 | 575 | 575 |
| H2O (vapor) (kg/d) | 250 | 250 | 250 | 0 | 0 | 250 | 250 |
| H2O (liquid) (kg/d) | 0 | 0 | 0 | 0 | 0 | 0 | 0 |
| MeOH (kg/d) | 0 | 0 | 0 | 0 | 0 | 0 | 0 |
| Estimate of TOTAL mass flow (kg/d) | 19325 | 19325 | 19325 | 20860 | 20860 | 40185 | 40185 |
| mass flow (kg/s) | 0.224 | 0.224 | 0.224 | 0.241 | 0.241 | 0.465 | 0.465 |

| Stream Name - Liquefier - Methane Loop | M6 | M7 | M8 | M9 | M10 | M11 |
|---|---|---|---|---|---|---|
| Pressure (kPa) | 2100 | 8600 | 8520 | 8500 | 8450 | 8400 |
| Temperature (° C.) | 47 | 160 | 47 | 22 | 22 | 22 |
| Density Vapor (kg/m3) | 12.5 | 38 | 57 | 61 | 61 | 61 |
| Density Liquid (kg/m3) | | | | | | |
| Vapor Fraction | 1 | 1 | 1 | 1 | 1 | 1 |
| MeOH (wt % of liquid) | 0 | 0 | 0 | 0 | 0 | 0 |
| Enthalpy (kJ/kg) | 940 | 1200 | 885 | 820 | 820 | 820 |
| Approximate Mass in kg with 28.3 e3m3/d -inlet | | | | | | |
| C1 (0.98 mol vol dry) (kg/d) | 39360 | 39360 | 39360 | 39360 | 39360 | 39360 |
| C02 (0.02 mol vol dry) kg/d) | 575 | 575 | 575 | 575 | 0.5 | 0.5 |
| H2O (vapor) (kg/d) | 250 | 250 | 18 | 18 | 18 | 3.9 |
| H2O (liquid) (kg/d) | 0 | 0 | 232 | 0 | 0 | 0 |
| MeOH (kg/d) | 0 | 0 | 0 | 0 | 0 | 0 |
| Estimate of TOTAL mass flow (kg/d) | 40185 | 40185 | 40185 | 39953 | 39378.5 | 39364.4 |
| mass flow (kg/s) | 0.465 | 0.465 | 0.465 | 0.462 | 0.456 | 0.456 |

| Stream Name - Liquefier - Methane Loop | M12 | M12a | M12b | M12c | M12d | M13 | M14 |
|---|---|---|---|---|---|---|---|
| Pressure (kPa) | 8400 | 8300 | 8275 | 8200 | 8225 | 8200 | 8200 |
| Temperature (° C.) | 22 | 22 | −39 | −54 | −64 | −70 | −88 |
| Density Vapor (kg/m3) | 61 | 61 | 105 | 155 | 205 | 245 | 300 |
| Density Liquid (kg/m3) | | | | | | 245 | 300 |
| Vapor Fraction | 1 | 1 | 1 | 1 | 1 | 0.999 | 0.999 |
| MeOH (wt % of liquid) | 0 | 0 | 0 | 0 | 0 | 0.75 | 0.75 |
| Enthalpy (kJ/kg) | 820 | 820 | 610 | 500 | 435 | 385 | 290 |
| Approximate Mass in kg with 28.3 e3m3/d -inlet | | | | | | | |
| C1 (0.98 mol vol dry) (kg/d) | 39360 | 39360 | 39360 | 39360 | 39360 | 39360 | 39360 |
| C02 (0.02 mol vol dry) kg/d) | 0.5 | 0.5 | 0.5 | 0.5 | 0.5 | 0.5 | 0.5 |
| H2O (vapor) (kg/d) | 3.9 | 3.9 | 3.9 | 3.9 | 3.9 | 0.04 | 0.04 |
| H2O (liquid) (kg/d) | 0 | 0 | 0 | 0 | 0 | 3.86 | 3.86 |
| MeOH (kg/d) | 11.7 | 11.7 | 11.7 | 11.7 | 11.7 | 11.7 | 11.7 |
| Estimate of TOTAL mass flow (kg/d) | 39376.1 | 39376.1 | 39376.1 | 39376.1 | 39376.1 | 39376.1 | 39376.1 |
| mass flow (kg/s) | 0.456 | 0.456 | 0.456 | 0.456 | 0.456 | 0.456 | 0.456 |

| Stream Name - Liquefier - Methane Loop | M15 | M16 | M17 | M18 | M19 | M20 | M21 |
|---|---|---|---|---|---|---|---|
| Pressure (kPa) | 8200 | 8200 | 200 | 200 | 200 | 185 | 170 |
| Temperature (° C.) | −88 | −88 | −152 | −152 | −152 | −70 | −29 |
| Density Vapor (kg/m3) | 300 | | 3.3 | | 3.3 | 1.6 | 1.3 |
| Density Liquid (kg/m3) | | 800 | 410 | 410 | | | |
| Vapor Fraction | 1 | 0 | 0.53 | 0 | 1 | 1 | 1 |
| MeOH (wt % of liquid) | 0.75 | 0.75 | 0 | 0 | 0 | 0 | 0 |
| Enthalpy (kJ/kg) | 285 | | 285 | 30 | 525 | 705 | 790 |
| Approximate Mass in kg with 28.3 e3m3/d -inlet | | | | | | | |
| C1 (0.98 mol vol dry) (kg/d) | 39360 | 0 | 39360 | 18500 | 20860 | 20860 | 20860 |
| C02 (0.02 mol vol dry) kg/d) | 0.5 | 0 | 0.5 | 0.5 | 0 | 0 | 0 |
| H2O (vapor) (kg/d) | 0.04 | 0 | 0.04 | 0.04 | 0 | 0 | 0 |
| H2O (liquid) (kg/d) | 0 | 3.86 | 0 | 0 | 0 | 0 | 0 |
| MeOH (kg/d) | 0.12 | 11.58 | 0.12 | 0.12 | 0 | 0 | 0 |
| Estimate of TOTAL mass flow (kg/d) | 39360.7 | 15.44 | 39360.7 | 18500.7 | 20860 | 20860 | 20860 |
| mass flow (kg/s) | 0.456 | 0.000 | 0.456 | 0.214 | 0.241 | 0.241 | 0.241 |

TABLE 1-continued

| Stream Name - Adsorption Refrig - Aq-NH3 Loop | Aq1 | Aq2 | Aq3 | Aq4 | Aq5 | Aq6 | Aq7 |
|---|---|---|---|---|---|---|---|
| Pressure (kPa) | 110 | 950 | 950 | 950 | 950 | 950 | 940 |
| Temperature (° C.) | 50.0 | 50.0 | 50.0 | 50.0 | 50.0 | 50.0 | 72.5 |
| Temperature (° F.) | 122.0 | 122.0 | 122.0 | 122.0 | 122.0 | 122.0 | 162.5 |
| Subcooled | yes | yes | yes | yes | yes | yes | yes |
| Saturated | | | | | | | |
| Superheated | | | | | | | |
| wt % Solution Aq-NH3 | 0.104 | 0.104 | 0.104 | 0.104 | 0.104 | 0.104 | 0.104 |
| Density Solution Aq-NH3 (kg/m3) | 937 | | | | | | |
| Total Enthalpy of AqMixture (KJ/kg) (Note 1) | 126 | 126 | 126 | 126 | 126 | 126 | 225 |
| Total Enthalpy of AqMixture (Btu/lb) (Note 1) | 54 | 54 | 54 | 54 | 54 | 54 | 98 |
| Approximate Mass in kg with 28.3 e3sem3/d -inlet | | | | | | | |
| Mass Aq-Ammonia liquid (kg/s) | 3.1715 | 3.171.5 | 1.5030 | 1.6685 | 1.3350 | 0.3330 | 0.3330 |
| Mass Aq-Ammonia vapor (kg/s) | 0.0000 | 0.0000 | 0.0000 | 0.0000 | 0.0000 | 0.0000 | 0.0000 |
| TOTAL Mass Aq-Ammonia (kg/s) | 3.1715 | 3.1715 | 1.5030 | 1.6685 | 1.3350 | 0.3330 | 0.3330 |

| Stream Name - Adsorption Refrig - Aq-NH3 Loop | Aq8 | Aq9 | Aq10 | Aq11 | Aq12 | Aq13 | Aq14 |
|---|---|---|---|---|---|---|---|
| Pressure (kPa) | 940 | 940 | 940 | 930 | 900 | 900 | 910 |
| Temperature (° C.) | 72.5 | 72.5 | 72.5 | 143.0 | 50.0 | 50.0 | 160.0 |
| Temperature (° F.) | 162.5 | 162.5 | 162.5 | 289.4 | 122.0 | 122.0 | 320.0 |
| Subcooled | yes | yes | yes | | | | |
| Saturated | | | | yes | yes | yes | yes |
| Superheated | | | | | | | |
| wt % Solution Aq-NH3 | 0.104 | 0.104 | 0.104 | 0.104 | | 0.560 | 0.050 |
| Density Solution Aq-NH3 (kg/m3) | | | | | | | |
| Total Enthalpy of AqMixture (KJ/kg) (Note 1) | 225 | 225 | 225 | 527 | | 7 | 638 |
| Total Enthalpy of AqMixture (Btu/lb) (Note 1) | 98 | 98 | 98 | 227 | | 3 | 275 |
| Approximate Mass in kg with 28.3 e3sem3/d -inlet | | | | | | | |
| Mass Aq-Ammonia liquid (kg/s) | 1.3350 | 1.5030 | 3.1715 | 3.1715 | | | 2.9900 |
| Mass Aq-Ammonia vapor (kg/s) | 0.0000 | 0.0000 | 0.0000 | 0.0000 | | | 0.0000 |
| TOTAL Mass Aq-Ammonia (kg/s) | 1.3350 | 1.5030 | 3.1715 | 3.1715 | | | 2.9900 |

| Stream Name - Adsorption Refrig - Aq-NH3 Loop | Aq15 | Aq16 | Aq17 | Aq18 | Aq19 | Aq20 |
|---|---|---|---|---|---|---|
| Pressure (kPa) | 890 | 880 | 10 | 13 | 30 | 72 |
| Temperature (° C.) | 85.0 | 22.0 | 24.6 | 28.1 | 34.1 | 49.8 |
| Temperature (° F.) | 185.0 | 71.6 | 76.3 | 82.6 | 93.4 | 121.6 |
| Subcooled | yes | yes | yes | yes | yes | yes |
| Saturated | | | | | | |
| wt % Solution Aq-NH3 | 0.050 | 0.050 | 0.055 | 0.062 | 0.073 | 0.104 |
| Density Solution Aq-NH3 (kg/m3) | | | | | | |
| Total Enthalpy of AqMixture (KJ/kg) (Note 1) | 319 | 35 | 58 | 39 | 74 | 125 |
| Total Enthalpy of AqMixture (Btu/lb) (Note 1) | 137 | 15 | 25 | 17 | 32 | 54 |
| Approximate Mass in kg with 28.3 e3sem3/d -inlet | | | | | | |
| Mass Aq-Ammonia liquid (kg/s) | 2.9900 | 2.9900 | 3.0058 | 3.0274 | 3.0663 | 3.1715 |
| Mass Aq-Ammonia vapor (kg/s) | 0.0000 | 0.0000 | 0.0000 | 0.0000 | 0.0000 | 0.0000 |
| TOTAL Mass Aq-Ammonia (kg/s) | 2.9900 | 2.9900 | 3.0058 | 3.0274 | 3.0663 | 3.1715 |

| Stream Name - Adsorption Refrig - NH3 loop | NH3-1 | NH3-2 | NH3-3 | RH3-4 | NH3-5 | NH3-6 | NH3-7 |
|---|---|---|---|---|---|---|---|
| Pressure (kPa) | 900 | 900 | 72 | 72 | 72 | 72 | 72 |
| Temperature (° C.) | 50.0 | 22.0 | −40.0 | −40.0 | −40.0 | −40.0 | −40.0 |
| Temperature (° F.) | 122.0 | 71.6 | −40.0 | −40.0 | −40.0 | −40.0 | −40.0 |
| Subcooled | | | | | | | |
| Saturated | yes | yes | yes | yes | yes | yes | yes |
| Superheated | | | | | | | |
| Pure Ammonia vapor fraction, (99.5 wt %) | 1 | 0 | 0.2 | 0.35 | 1 | 1 | 0 |
| Density Vapor (kg/m3) | 5.7 | | 0.61 | 0.61 | 0.61 | 0.61 | |
| Density Liquid (kg/m3) | | 610 | 685 | 685 | | | 685 |
| Enthaphy NH3-l (kJ/kg, from mollier chart) | | 440 | 160 | 160 | | | 160 |
| Enthapy NH3-v (kJ/kg, from mollier chart) | 1705 | | 1550 | 1550 | 1550 | 1550 | |
| Corrected Enthalpy NH3-l (kJ/kg) - 1938 | | 440 | 160 | 150 | | | −188 |
| Corrected Enthapy NH3-v (kJ/kg) - 1938 | 1705 | | 1550 | 1550 | 1550 | 1550 | |
| Approximate Mass in kg with 28.3 e3scm3/d -inlet | | | | | | | |
| Mass NH3-l (kg/s) | | 0.1815 | 0.1452 | 0.0689 | 0.0000 | 0.0000 | 0.0763 |
| Mass NH3-v (kg/s) | 0.1815 | | 0.0363 | 0.0363 | 0.1052 | 0.1052 | 0.0000 |
| Mass NH3 TOTAL (kg/s) | 0.1815 | 0.1815 | 0.1815 | 0.1052 | 0.1052 | 0.1052 | 0.0763 |

TABLE 1-continued

| Stream Name - Adsorption Refrig - NH3 loop | NH3-8 | NH3-9 | NH3-10 | NH3-11 | NH3-12 | NH3-13 | NH3-14 |
|---|---|---|---|---|---|---|---|
| Pressure (kPa) | 30 | 30 | 30 | 30 | 30 | 13 | 13 |
| Temperature (° C.) | −55.0 | −55.0 | −55.0 | −55.0 | −55.0 | −65.0 | −65.0 |
| Temperature (° F.) | −67.0 | −67.0 | −67.0 | −67.0 | −67.0 | −85.0 | −85.0 |
| Subcooled | | | | | | | |
| Saturated | yes | yes | yes | yes | yes | yes | yes |
| Superheated | | | | | | | |
| Pure Ammonia vapor fraction, (99.5 wt %) | 0.05 | 0.098 | 1 | 1 | 0 | 0.06 | 1 |
| Density Vapor (kg/m3) | 0.27 | 0.27 | 0.27 | 0.27 | | 0.13 | 0.13 |
| Density Liquid (kg/m3) | 710 | 710 | | | 710 | 715 | |
| Enthaphy NH3-l (kJ/kg, from mollier chart) | 95 | 95 | | | 95 | 50 | |
| Enthapy NH3-v (kJ/kg, from mollier chart) | 1525 | 1525 | 1525 | 1525 | | 1510 | 1510 |
| Corrected Enthaphy NH3-l (kJ/kg) - 1938 | −253 | −253 | | | −253 | −298 | |
| Corrected Enthapy NH3-v (kJ/kg) - 1938 | 1177 | 1177 | 1177 | 1177 | | 1162 | 1162 |
| Approximate Mass in kg with 28.3 e3scm3/d -inlet | | | | | | | |
| Mass NH3-l (kg/s) | 0.0725 | 0.0351 | 0.0000 | 0.0000 | 0.0374 | 0.0203 | 0.0000 |
| Mass NH3-v (kg/s) | 0.0038 | 0.0038 | 0.0389 | 0.0389 | 0.0000 | 0.0013 | 0.0216 |
| Mass NH3 TOTAL (kg/s) | 0.0763 | 0.0389 | 0.0389 | 0.0389 | 0.0374 | 0.0216 | 0.0216 |

| Stream Name - Adsorption Refrig - NH3 loop | NH3-15 | NH3-16 | NH3-17 | NH3-18 | NH3-19 |
|---|---|---|---|---|---|
| Pressure (kPa) | 13 | 13 | 10 | 10 | 10 |
| Temperature (° C.) | −65 | −65 | −71 | −71 | −71 |
| Subcooled | | | | | |
| Saturated | yes | yes | yes | yes | yes |
| Superheated | | | | | |
| Pure Ammonia vapor fraction, (99.5 wt %) | 1 | 0 | 0.018 | 1 | 1 |
| Density Vapor (kg/m3) | 0.13 | | 0.1 | 0.1 | 0.1 |
| Density Liquid (kg/m3) | | 715 | 725 | | |
| Enthaphy NH3-l (kJ/kg, from mollier chart) (Note 2) | | 58 | 30 | | |
| Enthapy NH3-v (kJ/kg, from mollier chart) (Note 2) | 1510 | | 1500 | 1500 | 1500 |
| Corrected Enthaphy NH3-l (kJ/kg) - 1938 | | −298 | −318 | | |
| Corrected Enthapy NH3-v (kJ/kg) - 1938 | 1162 | | 1152 | 1152 | 1152 |
| Approximate Mass in kg with 28.3 e3scm3/d -inlet | | | | | |
| Mass NH3-l (kg/s) | 0.0000 | 0.0158 | 0.0155 | 0.0000 | 0.0000 |
| Mass NH3-v (kg/s) | 0.0216 | 0.0000 | 0.0000 | 0.0153 | 0.0158 |
| Mass NH3 TOTAL (kg/s) | 0.0216 | 0.0158 | 0.0155 | 0.0153 | 0.0158 |

(Note 1)
Enthalphy for Aqua-Ammonia from 1938 - Jennings and Shannon Tables - Lehigh University Bethlehem, Pennsylvania
(Note 2)
(to zero (kJ/kg) anhydrous ammonia mollier chart to aq-Ammonia 1938 table) -348

| Equipment Name | RAqPump | DPX | AqRLX | Trim-Heat | WHX-1 | WHX-2 |
|---|---|---|---|---|---|---|
| TOTAL mass flow (kg/s) | 3.172 | | 2.990 | | 0.455 | 0.465 |
| Enthalpy Change (kJ/kg) | | | −319 | | −280 | −315 |
| Heat In/Out (kW) | | −436 | −954 | 924 | −130 | −147 |
| Work In/Out (kW) | 10 | | | | | |

| Equipment Name | WHX-IN | COMP-IN | STG-1 | STG-2 | STG-3 |
|---|---|---|---|---|---|
| TOTAL mass flow (kg/s) | 0.224 | 0.224 | 0.241 | 0.465 | 0.465 |
| Enthalpy Change (kJ/kg) | −145 | 248 | 215 | 265 | 260 |
| Heat In/Out (kW) | −32 | | | | |
| Work In/Out (kW) | | 55 | 52 | 123 | 121 |

| Equipment Name | HSX-1 | HSX-2 | HSX-3 | HSX-4 | HSX-5 |
|---|---|---|---|---|---|
| TOTAL mass flow (kg/s) | 2.990 | 0.182 | 0.456 | 3.172 | 0.462 |
| Enthalpy Change (kJ/kg) | −284 | −1265 | 0 | 0 | −65 |
| Heat In/Out (kW) | −849 | −230 | 0 | 0 | −30 |
| Work In/Out (kW) | | | | | |

| Equipment Name | NH3-CH1 | NH3-CH2 | NH3-CH3 | NH3-CH4 | GGX-1 | GGX-2 |
|---|---|---|---|---|---|---|
| TOTAL mass flow (kg/s) | 0.456 | 0.456 | 0.456 | 0.456 | 0.241 | 0.241 |
| Enthalpy Change (kJ/kg) | −210 | −110 | −65 | −50 | 85 | 180 |
| Heat In/Out (kW) | −96 | −50 | −30 | −23 | 21 | 43 |
| Work In/Out (kW) | | | | | | |

The invention claimed is:

1. A method for liquefying a gas comprising:
   (a) receiving a gas having an inlet pressure and compressing the gas to a desired pressure;
   (b) chilling the compressed gas through at least one absorption chiller;
   (c) adiabatically reducing the pressure of the chilled gas to liquefy at least a portion of the gas, and thereby producing a liquefied gas;
   (d) heating a rich aqua-ammonia fluid in a rectifier to liberate ammonia gas using heat of compression recovered from step (a), producing a lean aqua-ammonia fluid;
   (e) subcooling the lean aqua-ammonia and circulating to the top of a vapour absorption tower (VAT);
   (f) condensing ammonia gas from the rectifier to produce liquid ammonia and flashing the liquid ammonia to produce chilled ammonia gas for use in the at least one absorption chiller; and
   (g) absorbing ammonia gas from the at least one absorption chiller into the lean aqua-ammonia in the vapour absorption tower to produce the rich aqua-ammonia fluid for step (d).

2. The method of claim 1 wherein the chilled gas is partially liquefied in step (c) and comprising the further steps of removing the liquefied gas and recycling unliquefied chilled gas in a vapour recycle loop which cools the unliquefied chilled gas stream before adiabatic pressure reduction and the unliquefied chilled gas is then compressed and combined with compressed gas in step (a).

3. The method of claim 1 wherein the liquefied gas comprises an industrial gas or a hydrocarbon gas, or any mixture of industrial or hydrocarbon gases.

4. The method of claim 1 wherein the liquefied gas is compressed below the critical point of the gas and the method reaches a gas liquefaction temperature of warmer than −71° C., prior to adiabatic expansion.

5. The method of claim 1 wherein the liquefied gas is compressed to above the critical point of the gas, and the method reaches a gas liquefaction temperature of about −71° C., prior to adiabatic expansion.

6. The method of claim 1 wherein the at least one absorption chiller comprises a liquid bleed stream to prevent increase of water concentration in the aqua-ammonia fluid.

7. The method of claim 1 wherein a sub atmospheric operating pressure at the top of the VAT is maintained by utilizing a sufficient mass flow of subcooled lean aqua-ammonia solution at the point of absorbing ammonia gas into the lean aqua-ammonia.

8. The method of claim 1 wherein some or all of the heat of solution and heat of condensation energy of absorbing ammonia gas into the lean aqua-ammonia solution is recovered in the VAT.

9. The method of claim 8 wherein heat recovery in the VAT is facilitated by pre-cooling the lean aqua-ammonia circulated to the top of the VAT and using hydraulic head to maintain the aqua-ammonia in a sub-cooled state.

10. The method of claim 1 comprising the further steps of cooling the chilled gas stream from step (b) utilizing gas/gas heat exchangers to further reduce the temperature of chilled gas stream prior to step (c).

11. The method of claim 1, comprising the further step of dehydrating the compressed gas from step (a) and before the absorption chiller of step (b).

12. The method of claim 11 wherein the gas is dehydrated by the addition of an alcohol in a sufficient quantity into the flow path, and condensing the alcohol and water before the adiabatic pressure reduction step.

13. The method of claim 1 wherein the liquefied gas is filtered after adiabatic pressure reduction to remove any solids from the liquefied gas product.

14. A gas liquefaction system comprising:
    a receiving stage for receiving an inlet gas at a desired pressure;
    a compression stage for compressing the inlet gas to the desired pressure to produce a compressed gas;
    a chilling stage comprising an absorption refrigeration loop for chilling the compressed gas to produce a chilled gas, wherein the absorption refrigeration loop comprises:
        a rectifier for liberating ammonia gas from a rich aqua-ammonia solution and producing a lean aqua-ammonia solution; and
        a vapour absorption tower (VAT) for absorbing ammonia gas from at least one absorption chiller into the lean aqua-ammonia solution in the VAT to produce the rich aqua-ammonia solution;
    a heat of compression energy recovery stage comprising at least one first heat exchanger for transferring heat from compressed gas in the compression stage to the rich aqua-ammonia solution in the rectifier; and
    a liquefaction stage comprising a JT valve for at least partially liquefying the chilled gas to produce a liquefied gas.

15. The system of claim 14 further comprising a gas recycle stage for recycling non-liquefied components of the chilled gas in a low pressure vapour recycle loop, which loop further chills the chilled gas, and which is then directed to the compression stage.

16. The system of claim 14 wherein the system further comprises a flow path for flow of the lean aqua-ammonia solution from the rectifier to the VAT, wherein the flow path comprises a second heat exchanger for transferring heat from the lean aqua-ammonia solution in the flow path to the rich aqua-ammonia solution in the absorption refrigeration loop at a point in the absorption refrigeration loop that is upstream of the rectifier.

17. The system of claim 16 wherein the flow path further comprises a third heat exchanger for sub-cooling the lean aqua-ammonia solution in the flow path at a point in the flowpath that is downstream of the second heat exchanger and upstream of the VAT.

18. The system of claim 14 wherein:
    (a) the system further comprises a flow path for flow of the lean aqua-ammonia solution from the rectifier to the VAT, wherein the flow path comprises a valve for controlling circulation of the lean aqua-ammonia solution to the top of the VAT; and
    (b) the absorption refrigeration loop comprises a pump for maintaining a suction pressure to remove a rich aqua-ammonia solution from the VAT.

19. The system of claim 14 wherein the VAT comprises an entry point for ammonia gas from the at least one absorption chiller, and an entry point for the lean aqua-ammonia solution, wherein the elevation of the entry point for ammonia gas is below the elevation of the entry point for the lean aqua-ammonia solution.

20. The system of claim 19 wherein the at least one absorption chiller comprises a plurality of absorption chillers, and wherein the entry point for ammonia gas into the VAT from one of the absorption chillers is at a different elevation than the entry point into the VAT from another one of the absorption chillers.

21. A method for liquefying a gas comprising the steps of:
(a) compressing the gas having an inlet pressure to a desired pressure while extracting heat from the gas to maintain a desired temperature;
(b) chilling the compressed gas through at least one absorption chiller;
(c) adiabatically reducing the pressure of the chilled gas to reduce the temperature of the chilled gas;
(d) liquefying the gas by using a liquefied gas vapourizer heat exchanger, where a second liquefied gas is vapourized;
(e) using heat from step (a) in a rectifier to liberate ammonia from a rich aqua-ammonia fluid and if necessary, adding trim heat to the rich aqua ammonia, and produce a lean aqua-ammonia fluid;
(f) subcooling the lean aqua-ammonia and circulating to the top of a vapour absorption tower;
(g) condensing ammonia gas from the rectifier and flashing the liquid ammonia to produce chilled ammonia gas for use in the at least one absorption chiller;
(h) absorbing ammonia gas from the at least one absorption chiller into the lean aqua-ammonia in the vapour absorption tower to produce the rich aqua-ammonia for step (d).

22. The method of claim 21 wherein the second liquefied gas is produced in accordance with the method of claim 1.

23. A gas liquefaction system comprising a receiving stage for receiving an inlet gas at a desired pressure, a chilling stage comprising an absorption refrigeration loop for chilling the gas, and a liquefaction stage comprising a JT valve for at least partially liquefying the gas.

24. The system of claim 23 further comprising a compression stage for compressing the gas to the desired pressure, a heat of compression energy recovery stage for transferring heat from the compression stage to the absorption refrigeration loop.

25. The system of claim 24 further comprising a gas recycle stage for recycling non-liquefied components of the gas in a low pressure vapour recycle loop, which loop further chills the compressed and chilled gas, and which is then directed to the compression stage.

* * * * *